(12) United States Patent
Takayama

(10) Patent No.: US 7,738,494 B2
(45) Date of Patent: Jun. 15, 2010

(54) COMMUNICATION APPARATUS, COMMUNICATION METHOD, AND PROGRAM

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/815,186

(22) PCT Filed: Jan. 27, 2006

(86) PCT No.: PCT/JP2006/301310

§ 371 (c)(1),
(2), (4) Date: Dec. 10, 2008

(87) PCT Pub. No.: WO2006/080436

PCT Pub. Date: Aug. 3, 2006

(65) Prior Publication Data
US 2009/0147803 A1    Jun. 11, 2009

(30) Foreign Application Priority Data
Jan. 31, 2005    (JP) .............................. 2005-023435

(51) Int. Cl.
*H04J 3/24* (2006.01)
(52) U.S. Cl. ......................... 370/475; 370/347; 370/356
(58) Field of Classification Search ................... 370/475
See application file for complete search history.

(56) References Cited

U.S. PATENT DOCUMENTS

| 7,346,061 B2 | 3/2008 | Takayama et al. |
| 2007/0073929 A1 | 3/2007 | Takayama et al. |

FOREIGN PATENT DOCUMENTS

| AU | 2003289230 | 7/2004 |
| JP | 2004-215225 | 7/2004 |
| JP | 2004-364145 | 12/2004 |

OTHER PUBLICATIONS

Australian Examination Report dated Jul. 7, 2008.
Standard ECMA-340, "Near Field Communication Interface and Protocol (NFCIP-1)", 2nd Edition, Dec. 2004, ECMA, 32 pages.

*Primary Examiner*—Ricky Ngo
*Assistant Examiner*—Iqbal Zaidi
(74) *Attorney, Agent, or Firm*—K&L Gates LLP

(57) ABSTRACT

A communication apparatus capable of using near field communication from various protocols, a communication method for use therewith, and a program for use therewith are provided. NFC communication apparatuses 1 to 3 capsulize an LLC packet of an LLC layer of a data link layer in an MAC packet of an MAC layer, capsulize the MAC packet in a physical layer packet of a physical layer, and transmit and receive the packet. In that case, the maximum length of the LLC packet is limited so as to be smaller than or equal to a length that is determined on the basis of the maximum length of the physical layer packet and the maximum number of MAC packets that can be transmitted continuously from the MAC layer to the LLC layer without making a response. The present invention can be applied to, for example, an IC card system or the like.

10 Claims, 18 Drawing Sheets

COMMUNICATION SYSTEM

FIG. 8

NFCIP-1 PROTOCOL COMMAND SET

| NAME | DEFINITION |
|---|---|
| ATR_REQ | Attribute Request (TRANSMITTED BY INITIATOR) |
| ATR_RES | Attribute Response (TRANSMITTED BY TARGET) |
| WUP_REQ | Wakeup Request (TRANSMITTED BY INITIATOR ONLY IN ACTIVE MODE) |
| WUP_RES | Wakeup Response (TRANSMITTED BY TARGET ONLY IN ACTIVE MODE) |
| PSL_REQ | Parameter Selection Request (TRANSMITTED BY INITIATOR) |
| PSL_RES | Parameter Selection Response (TRANSMITTED BY TARGET) |
| DEP_REQ | Data Exchange Protocol Request (TRANSMITTED BY INITIATOR) |
| DEP_RES | Data Exchange Protocol Response (TRANSMITTED BY TARGET) |
| DSL_REQ | Deselect Request (TRANSMITTED BY INITIATOR) |
| DSL_RES | Deselect Response (TRANSMITTED BY TARGET) |
| RLS_REQ | Release Request (TRANSMITTED BY INITIATOR) |
| RLS_RES | Release Response (TRANSMITTED BY TARGET) |

FLOW OF INITIALIZATION AND SDD

FIG. 14

Definition of the Information pdu:

| bit 7 | bit 6 | bit 5 | bit 4 | bit 3 | bit 2 | bit 1 | bit 0 |
|-------|-------|-------|-------|-------|-------|-------|-------|
| ZERO  | ZERO  | ZERO  | MI    | NAD   | DID   | PNI   | PNI   |

FIG. 15

Definition of ACK / NACK pdu:

| bit 7 | bit 6 | bit 5 | bit 4 | bit 3 | bit 2 | bit 1 | bit 0 |
|---|---|---|---|---|---|---|---|
| ZERO | ONE | ZERO | ACK / NACK | NAD | DID | PNI | PNI |

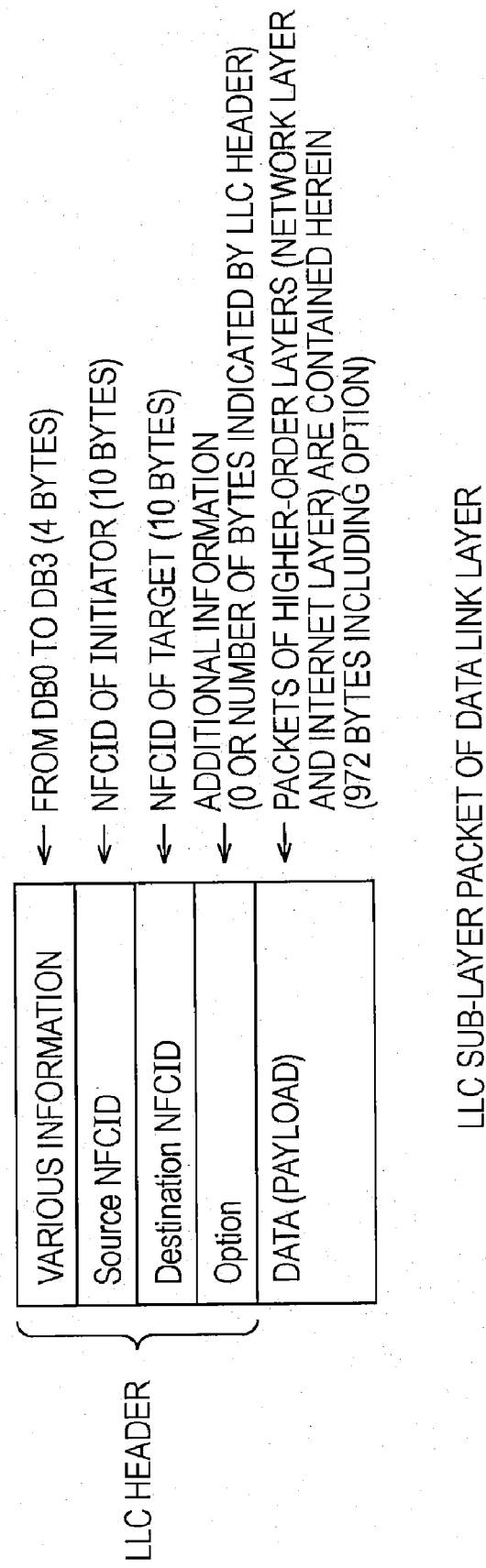

COMMUNICATION APPARATUS, COMMUNICATION METHOD, AND PROGRAM

CROSS REFERENCE TO RELATED APPLICATIONS

The present application claims priority to Japanese Patent Application JP 2005-023435, filed on Jan. 31, 2005, the entire contents of which is being incorporated herein by reference.

BACKGROUND

The subject matter of the present application relates to a communication apparatus, a communication method, and a program, and relates to, for example, a communication apparatus capable of using near field communication of a protocol of lower-order layers of an OSI (Open System Interconnection) reference model from various protocols of higher-order layers thereof, a communication method for use therewith, and a program for use therewith.

As a system for performing near field communication, for example, an IC (Integrated Circuit) card system is widely known. In the IC card system, a reader/writer generates an electromagnetic wave, thereby forming a so-called RF (Radio Frequency) field (magnetic field). Then, when an IC card approaches the reader/writer, the IC card receives supply of power by electromagnetic induction and also data is transmitted between the reader/writer and the IC card.

As a communication protocol for performing near field communication typified by that of such an IC card system, for example, NFCIP (Near Field Communication Interface and Protocol)-1 is known. NFCIP-1 is also defined as ISO/IEC 18092.

For NFCIP-1, the following modes are defined: an active mode that is a communication mode in which each of a plurality of communication apparatuses for transmitting and receiving data outputs an electromagnetic wave, modulates the electromagnetic wave, and thereby transmits data, and a passive mode that is a communication mode in which data is transmitted by load-modulating an electromagnetic wave output by one communication apparatus among the other communication apparatuses of the plurality of communication apparatuses. A plurality of communication apparatuses in compliance with NFCIP-1 perform communication in one of the communication modes of the active mode and the passive mode (refer to, for example, Japanese Unexamined Patent Application Publication No. 2004-215225 and Standard ECMA-340, "Near Field Communication Interface and Protocol (NFCIP-1)", 2nd Edition, December 2004, ECMA).

SUMMARY

NFCIP-1 defines a physical layer of a first layer (lowest-order layer) of an OSI reference model and a data link layer of a second layer thereof. Therefore, in theory, it is possible to use NFCIP-1 from various protocols of a network layer of a third layer, which is a higher-order layer. However, a specific method (protocol) for using NFCIP-1 from various protocols of a network layer has not been proposed to date.

The present embodiments are in view of such circumstances and aim to be capable of using, for example, near field communication employing NFCIP-1 or the like from various protocols of higher-order layers.

A first communication apparatus according to an embodiment includes communication means for performing communication in one of communication modes of an active mode, which is a communication mode in which each of a plurality of apparatuses for transmitting and receiving data outputs an electromagnetic wave, modulates the electromagnetic wave, and thereby transmits data; and a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and control means for performing control such that an LLC packet that is a packet of an LLC (Logical link control) layer of a data link layer of an OSI (Open System Interconnection) reference model is capsulized to form an MAC packet that is a packet of an MAC (Media Access Control) layer of the data link layer, the MAC packet is capsulized to form a physical layer packet that is a packet of a physical layer, and the physical layer packet is transmitted in the active mode or in the passive mode, wherein the control means limits the maximum length of the LLC packet so as to be smaller than or equal to a length that is determined on the basis of the maximum length of the physical layer packet and the maximum number of MAC packets that can be transmitted continuously from the MAC layer to the LLC layer without making a response.

A first communication method according to an embodiment includes communication means for performing communication in one of communication modes of an active mode, which is a communication mode in which each of a plurality of apparatuses for transmitting and receiving data outputs an electromagnetic wave, modulates the electromagnetic wave, and thereby transmits data; and a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and a control step of performing control such that an LLC packet that is a packet of an LLC (Logical link control) of a data link layer of an OSI (Open System Interconnection) reference model is capsulized to form an MAC packet that is a packet of an MAC (Media Access Control) layer of the data link layer, the MAC packet is capsulized to form a physical layer packet that is a packet of a physical layer, and the physical layer packet is transmitted in the active mode or in the passive mode, wherein, in the control step, the maximum length of the LLC packet is limited so as to be smaller than or equal to a length that is determined on the basis of the maximum length of the physical layer packet and the maximum number of MAC packets that can be transmitted continuously from the MAC layer to the LLC layer without making a response.

A first program according to an embodiment includes communication means for performing communication in one of communication modes of an active mode, which is a communication mode in which each of a plurality of apparatuses for transmitting and receiving data outputs an electromagnetic wave, modulates the electromagnetic wave, and thereby transmits data; and a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and a control step of performing control such that an LLC packet that is a packet of an LLC (Logical link control) of a data link layer of an OSI (Open System Interconnection) reference model is capsulized to form an MAC packet that is a packet of an MAC (Media Access Control) layer of the data link layer, the MAC packet is capsulized to form a physical layer packet that is a packet of a physical layer, and the physical layer packet is transmitted in the active mode or in the passive mode, wherein, in the control step, the maximum length of the LLC packet is limited so as to be smaller than or equal to a length that is determined on the basis of the maximum length of the physical layer packet and the maximum number of MAC packets that can be transmitted continuously from the MAC layer to the LLC layer without making a response.

A second communication apparatus according to an embodiment includes communication means for performing communication in one of communication modes of an active mode, which is a communication mode in which each of a plurality of apparatuses for transmitting and receiving data outputs an electromagnetic wave, modulates the electromagnetic wave, and thereby transmits data; and a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and control means for performing control such that an LLC packet that is a packet of an LLC (Logical link control) layer of a data link layer of an OSI (Open System Interconnection) reference model is capsulized to form an MAC packet that is a packet of an MAC (Media Access Control) layer of the data link layer, the MAC packet is capsulized to form a physical layer packet that is a packet of a physical layer, and the physical layer packet from an apparatus for transmitting the physical layer packet is received in the active mode or in the passive mode, wherein the maximum length of the LLC packet is limited so as to be smaller than or equal to a length that is determined on the basis of the maximum length of the physical layer packet and the maximum number of MAC packets that can be transmitted continuously from the MAC layer to the LLC layer without making a response.

A second communication method according to an embodiment includes communication means for performing communication in one of communication modes of an active mode, which is a communication mode in which each of a plurality of apparatuses for transmitting and receiving data outputs an electromagnetic wave, modulates the electromagnetic wave, and thereby transmits data; and a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and performing control such that such that an LLC packet that is a packet of an LLC (Logical link control) layer of a data link layer of an OSI (Open System Interconnection) reference model is capsulized to form an MAC packet that is a packet of an MAC (Media Access Control) layer of the data link layer, the MAC packet is capsulized to form a physical layer packet that is a packet of a physical layer, and the physical layer packet from an apparatus for transmitting the physical layer packet is received in the active mode or in the passive mode, wherein the maximum length of the LLC packet is limited so as to be smaller than or equal to a length that is determined on the basis of the maximum length of the physical layer packet and the maximum number of MAC packets that can be transmitted continuously from the MAC layer to the LLC layer without making a response.

A second program according to an embodiment includes communication means for performing communication in one of communication modes of an active mode, which is a communication mode in which each of a plurality of apparatuses for transmitting and receiving data outputs an electromagnetic wave, modulates the electromagnetic wave, and thereby transmits data; and a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and a control step of performing control such that an LLC packet that is a packet of an LLC (Logical link control) layer of a data link layer of an OSI (Open System Interconnection) reference model is capsulized to form an MAC packet that is a packet of an MAC (Media Access Control) layer of the data link layer, the MAC packet is capsulized to form a physical layer packet that is a packet of a physical layer, and the physical layer packet from an apparatus for transmitting the physical layer packet is received in the active mode or in the passive mode, wherein the maximum length of the LLC packet is limited so as to be smaller than or equal to a length that is determined on the basis of the maximum length of the physical layer packet and the maximum number of MAC packets that can be transmitted continuously from the MAC layer to the LLC layer without making a response.

In the first communication apparatus, the first communication method, and the first program according to the embodiments, an LLC packet, which is a packet of an LLC layer of a data link layer of an OSI reference model, is capsulized to form an MAC packet, which is a packet of an MAC layer of the data link layer. Furthermore, the MAC packet is capsulized to form a physical layer packet, which is a packet of a physical layer. Then, the physical layer packet is transmitted in an active mode or in a passive mode. In this case, the maximum length of the LLC packet is limited so as to be smaller than or equal to a length that is determined on the basis of the maximum length of the physical layer packet and the maximum number of MAC packets that can be transmitted continuously from the MAC layer to the LLC layer without making a response.

In the second communication apparatus, the second communication method, and the second program according to the embodiment, an LLC packet, which is a packet of an LLC layer of a data link layer of an OSI reference model, is capsulized to form an MAC packet, which is a packet of an MAC layer of the data link layer. The MAC packet is capsulized to form a physical layer packet, which is a packet of a physical layer. The physical layer packet from an apparatus for transmitting the physical layer packet is received in an active mode or in a passive mode. In this case, the maximum length of the LLC packet is limited so as to be smaller than or equal to a length that is determined on the basis of the maximum length of the physical layer packet and the maximum number of MAC packets that can be transmitted from the MAC layer to the LLC layer without making a response.

According to an embodiment, it is possible to use, for example, near field communication employing NFCIP-1 or the like from various protocols of higher-order layers of an OSI reference model.

Additional features and advantages are described herein, and will be apparent from, the following Detailed Description and the figures.

BRIEF DESCRIPTIONS OF THE FIGURES

FIG. 8 shows a list of commands and responses.

FIG. 14 shows the format of PFB information.

FIG. 15 shows the format of PFB information.

FIG. 18 shows the format of an LLC packet.

DETAILED DESCRIPTION

Embodiments are described below with reference to the drawings.

Figure 1:
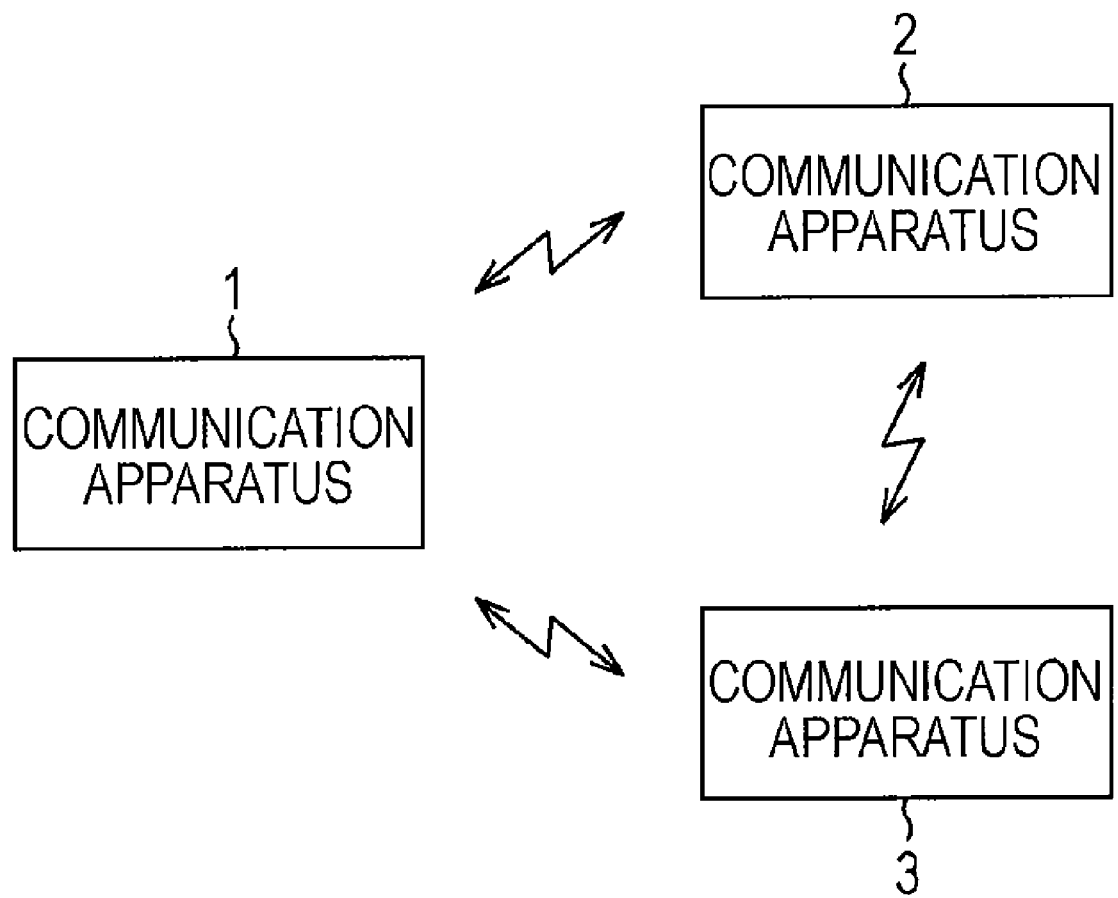
FIG. 1 shows an example of the configuration of an embodiment of a communication system.

FIG. 1 shows an example of the configuration of an embodiment of a communication system (the system designates a logical assembly of a plurality of devices, and it does not matter whether each device is in the same housing).

In FIG. 1, the communication system is constituted by three NFC communication apparatuses 1, 2, and 3. Each of the NFC communication apparatuses 1 to 3 is designed to be capable of performing near field communication (NFC (Near Field Communication)) by electromagnetic induction using a carrier wave of a single frequency with other NFC communication apparatuses.

At this point, examples of a frequency of a carrier wave used by the NFC communication apparatuses 1 to 3 include 13.56 MHz of an ISM (Industrial Scientific Medical) band.

The phrase near field communication means communication that becomes possible when the distance between apparatuses that perform communication becomes within several 10 cm, and also includes communication performed with (the housings of) apparatuses that perform communication being brought into contact with each other.

The communication system of FIG. 1 can be adopted as an IC card system in which one or more of the NFC communication apparatuses 1 to 3 can be made to be a reader/writer and the other one or more can be made to be an IC card. Also, each of the NFC communication apparatuses 1 to 3 can be adopted as a communication system of a PDA (Personal Digital Assistant), a PC (Personal Computer), a mobile phone, a wrist watch, a pen, and the like. That is, the NFC communication apparatuses 1 to 3 are apparatuses that perform near field communication and are not limited to an IC card, a reader/writer, and the like of the IC card system.

The NFC communication apparatuses 1 to 3 are capable of performing communication in two communication modes. Examples of the two communication modes include a passive mode and an active mode. For example, communication between the NFC communication apparatuses 1 and 2 among the NFC communication apparatuses 1 to 3 will now be considered. In the passive mode, similarly to the above-described IC card system of the related art, for example, the NFC communication apparatus 1, which is one of the NFC communication apparatuses 1 and 2, modulates (a carrier wave corresponding to) an electromagnetic wave generated by itself and thereby transmits data to the NFC communication apparatus 2 that is the other NFC communication apparatus, and the NFC communication apparatus 2 load-modulates (a carrier wave corresponding to) the electromagnetic wave generated by the NFC communication apparatus 1 and thereby transmits data to the NFC communication apparatus 1.

On the other hand, in the active mode, each of the NFC communication apparatuses 1 and 2 modulates (a carrier wave corresponding to) an electromagnetic wave generated by itself and thereby transmits data.

Figure 2:
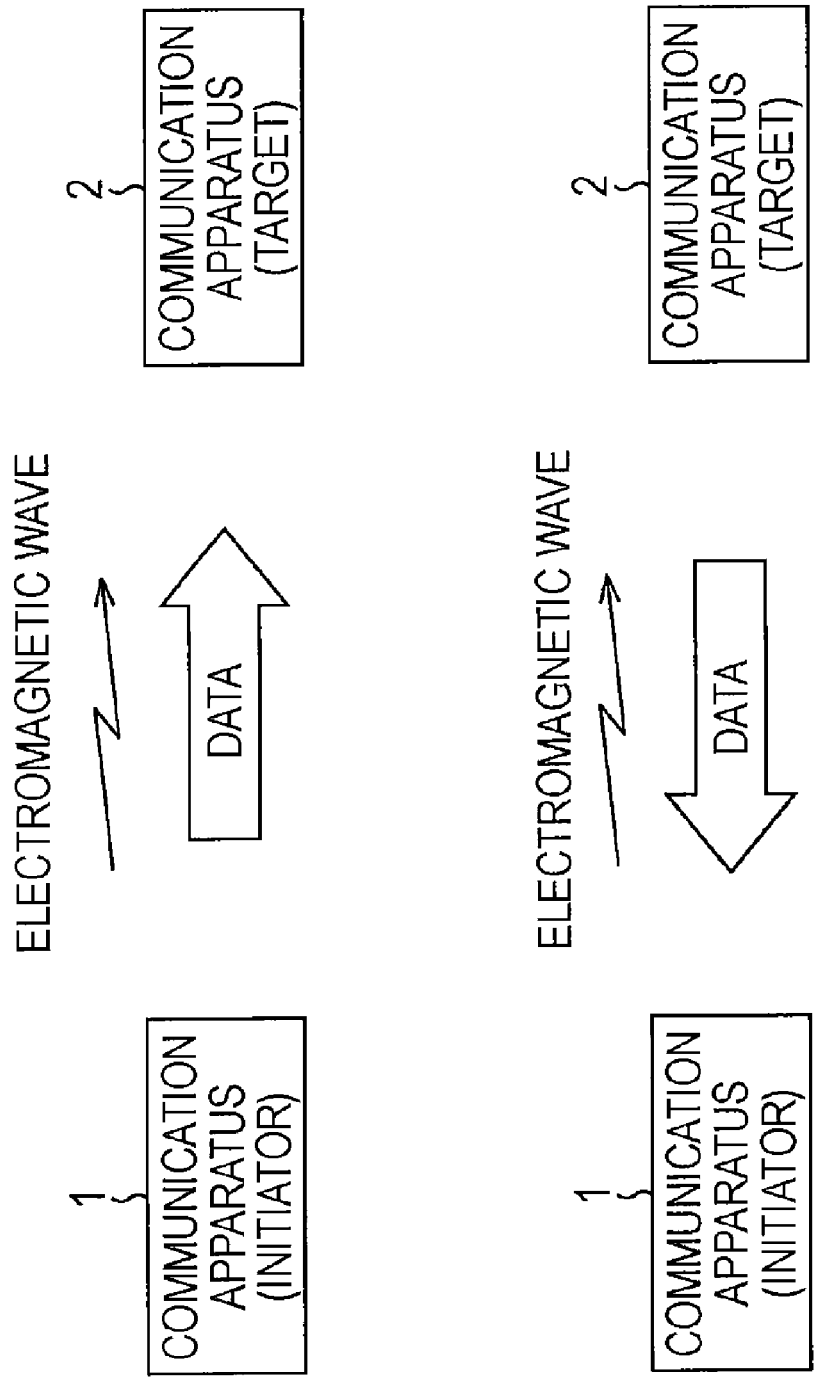
FIG. 2 illustrates a passive mode.
Figure 3:
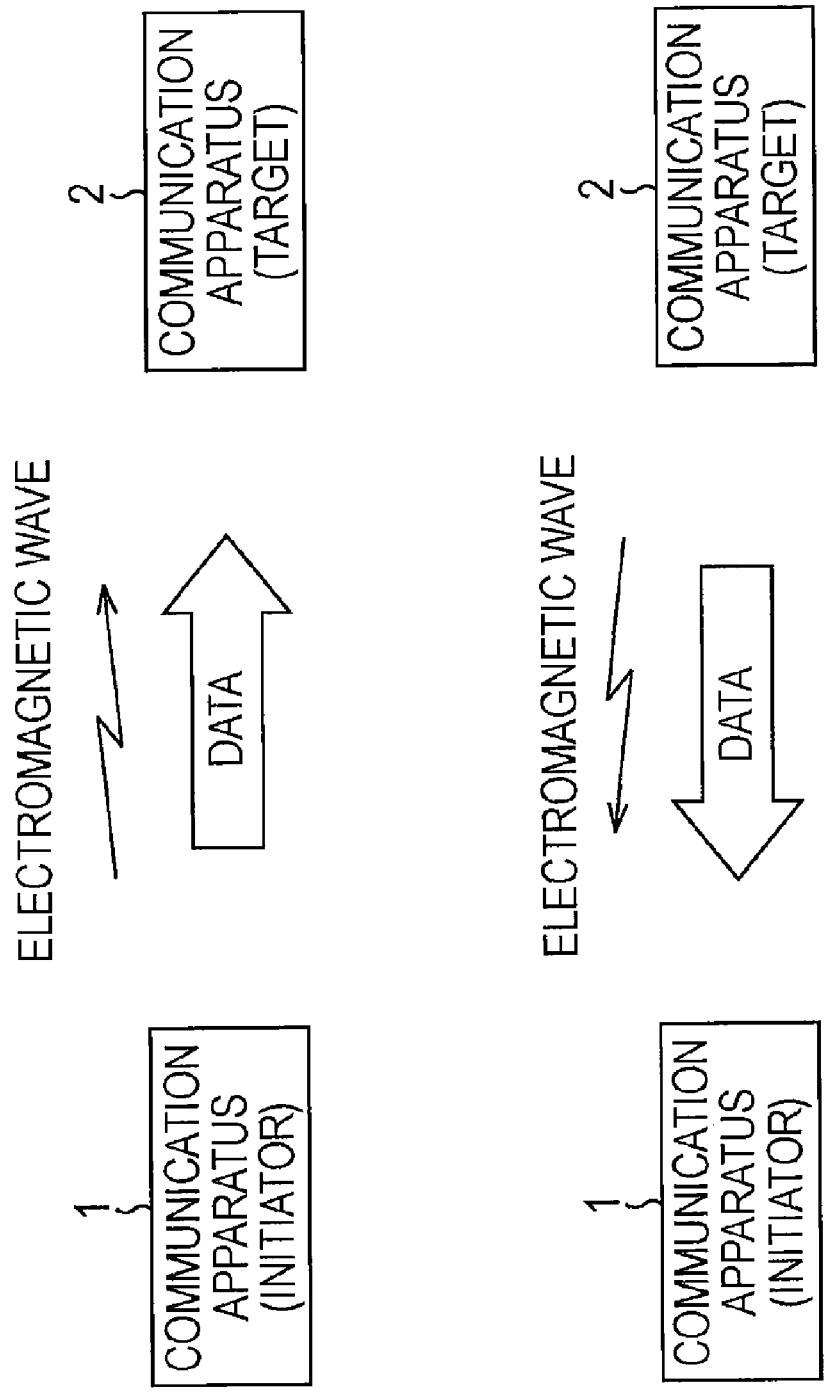
FIG. 3 illustrates an active mode.

At this point, when near field communication employing electromagnetic induction is to be performed, an apparatus that starts communication by outputting an electromagnetic wave first, that is, an apparatus that, so to speak, takes the initiative of communication, will be referred to as an initiator. Near field communication is performed in such a manner that the initiator transmits a command to a communication party thereof, and the communication party sends back a response to the command. The communication party that sends back a response to the command from the initiator will be referred to as a target. For example, it is assumed that the NFC communication apparatus 1 starts to output an electromagnetic wave and starts communicating with the NFC communication apparatus 2. As shown in FIGS. 2 and 3, the NFC communication apparatus 1 becomes an initiator, and the NFC communication apparatus 2 becomes a target.

In the passive mode, as shown in FIG. 2, the NFC communication apparatus 1 that is an initiator continues to output an electromagnetic wave. The NFC communication apparatus 1 modulates the electromagnetic wave output by itself, and thereby transmits data to the NFC communication apparatus 2 that is a target. Also, the NFC communication apparatus 2 load-modulates the electromagnetic wave output by the NFC communication apparatus 1 that is an initiator and thereby transmits data to the NFC communication apparatus 1.

On the other hand, as shown in FIG. 3, in the active mode, when the NFC communication apparatus 1, which is an initiator, transmits data, the NFC communication apparatus 1 starts to output an electromagnetic wave, modulates the electromagnetic wave, and thereby transmits data to the NFC communication apparatus 2 that is a target. Then, after the transmission of data is completed, the NFC communication apparatus 1 stops outputting the electromagnetic wave. Also, when the NFC communication apparatus 2, which is a target, transmits data, the NFC communication apparatus 2 starts to output an electromagnetic wave, and modulates the electromagnetic wave, and thereby transmits data to the NFC communication apparatus 2, which is a target. Then, after the transmission of data is completed, the NFC communication apparatus 2 stops outputting the electromagnetic wave.

In FIG. 1, the communication system is constituted by three NFC communication apparatuses 1 to 3. However, the number of NFC communication apparatuses constituting the communication system is not limited to 3, and may be 2 or 4 or more. Furthermore, the communication system can include, in addition to an NFC communication apparatus, for example, an IC card, a reader/writer, and the like constituting an IC card system of the related art.

Figure 4:
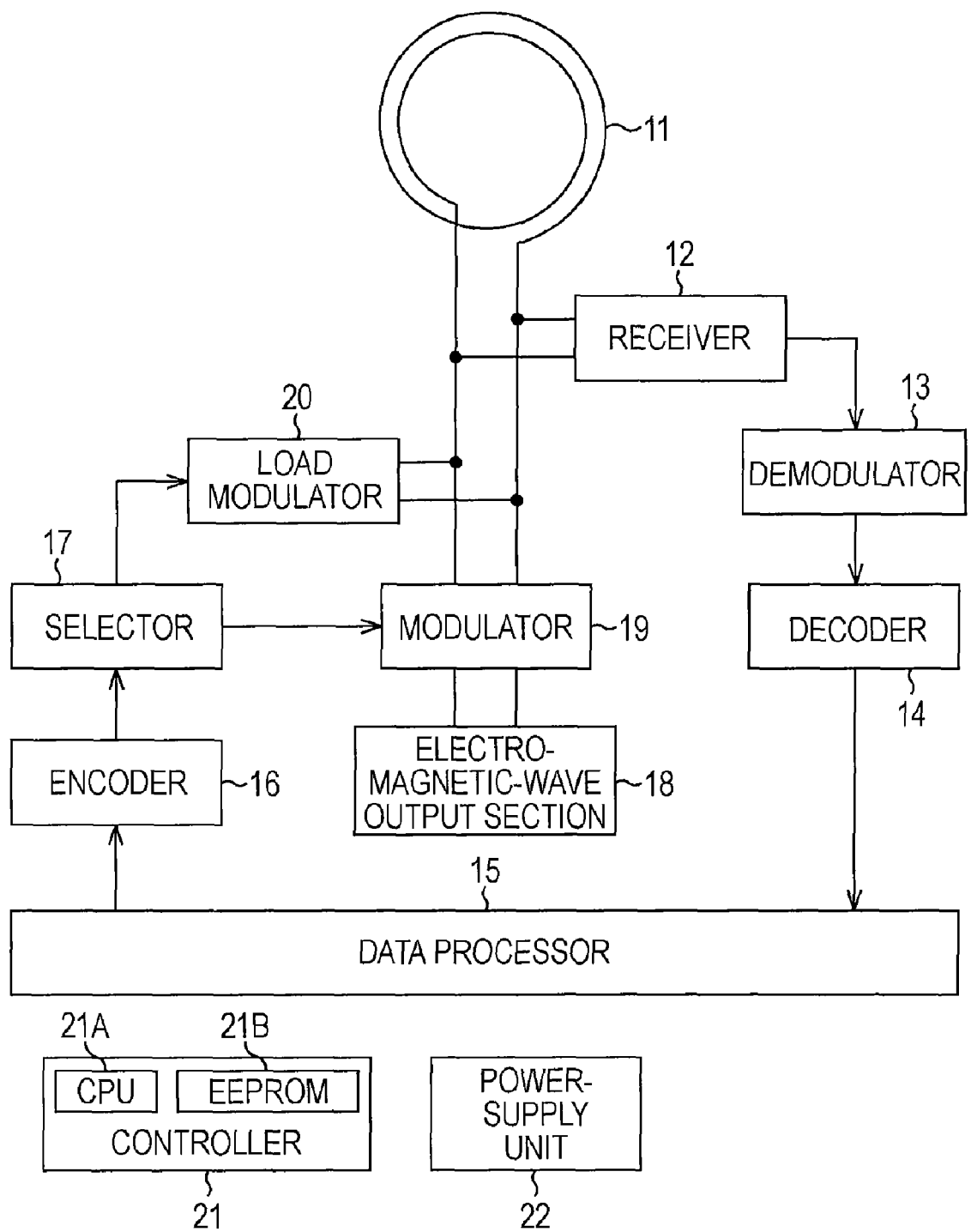
FIG. 4 is a block diagram showing an example of the configuration of an NFC communication apparatus 1.

Next, FIG. 4 shows an example of the configuration of the NFC communication apparatus 1 of FIG. 1. The other NFC communication apparatuses 2 and 3 of FIG. 1 are configured similarly to the NFC communication apparatus 1 of FIG. 4, and accordingly, a description thereof is omitted.

An antenna 11 is configured to include a coil of a closed loop, and outputs an electromagnetic wave as a result of electrical current flowing through the coil being changed. Furthermore, as a result of magnetic fluxes passing through the coil as the antenna 11 being changed, electrical current flows through the antenna 11.

A receiver 12 receives electrical current flowing through the antenna 11, performs tuning and detection, and outputs a signal to a demodulator 13. The demodulator 13 demodulates the signal supplied from the receiver 12 and supplies the demodulated signal to a decoder 14. The decoder 14 decodes, for example, a Manchester code or the like as a signal supplied from the demodulator 13, and supplies data obtained by the decoding to a data processor 15.

The data processor 15 performs predetermined processing based on the data supplied from the decoder 14. Also, the data processor 15 supplies an encoder 16 with data to be transmitted to another apparatus.

The encoder 16 encodes the data supplied from the data processor 15 into, for example, a Manchester code, and supplies the code to a selector 17. The selector 17 selects either a modulator 19 or a load modulator 20, and outputs the signal supplied from the encoder 16 to the selected unit.

At this point, under the control of a controller 21, the selector 17 selects the modulator 19 or the load modulator 20. The controller 21 controls the selector 17 to select the load modulator 20 when the communication mode is a passive mode and the NFC communication apparatus 1 is a target. Also, when the communication mode is an active mode or when the communication mode is a passive mode and the NFC communication apparatus 1 is an initiator, the controller 21 controls the selector 17 to select the modulator 19. Accordingly, the signal output by the encoder 16 is supplied to the load modulator 20 through the selector 17 when the communication mode is a passive mode and the NFC communication apparatus 1 is a target, and is supplied to the modulator 19 through the selector 17 in other cases.

An electromagnetic wave output section 18 supplies the antenna 11 with electric current for allowing the antenna 11 to radiate (electromagnetic waves of) a carrier wave having a predetermined single frequency. In accordance with the signal supplied from the selector 17, the modulator 19 modulates the carrier wave as the electric current supplied to the antenna 11 by the electromagnetic wave output section 18. This allows the antenna 11 to radiate carrier-modulated electromagnetic waves in accordance with data output to the encoder 16 by the data processor 15.

The load modulator 20 changes, in accordance with the signal supplied from the selector 17, an impedance obtained when the coil as the antenna 11 is externally observed. When an RF field (magnetic field) is formed around the antenna 11 as a result of another apparatus outputting electromagnetic waves as a carrier wave, the impedance, obtained when the coil as the antenna 11 is observed, changes, whereby the RF field around the antenna 11 also changes. This modulates (load-modulates) the carrier wave as the electromagnetic waves output by the other apparatus in accordance with the signal supplied from the selector 17, and transmits, to the other apparatus outputting the electromagnetic waves, the data output to the encoder 16 by the data processor 15.

At this point, for example, amplitude shift keying (ASK) can be employed as a modulation method in the modulator 19 and the load modulator 20. However, the modulation method in the modulator 19 and the load modulator 20 is not limited to ASK, and PSK (Phase Shift Keying), QAM (Quadrature Amplitude Modulation), etc., can be employed. The modulation factor of the amplitude is not limited to numerical values, such as 8% to 30%, 50%, and 100%, and a suitable value may be selected.

The controller 21 controls blocks constituting the NFC communication apparatus 1. That is, the controller 21 is constituted by, for example, a CPU (Central Processing Unit) 21A, an EEPROM (Electrically and Erasable Programmable Read Only Memory) 21B, a RAM (Random Access Memory) (not shown), and others. The CPU 21A executes a program stored in the EEPROM 21B. As a result, control of blocks constituting the NFC communication apparatus 1 and other various kinds of processing are performed. The EEPROM 21B has stored therein a program to be executed by the CPU 21A and data that is necessary when the CPU 21A operates.

A series of processes performed by the CPU 21A by executing a program can be performed in such a way that dedicated hardware is provided in place of the CPU 21A and the dedicated hardware performs the processes. In addition to being installed into the EEPROM 21B in advance, a program to be executed by the CPU 21A can be temporarily or permanently stored (recorded) in a removable recording medium, such as a flexible disk, a CD-ROM (Compact Disc Read Only Memory), an MO (Magneto Optical) disk, a DVD (Digital Versatile Disc), a magnetic disk, or a semiconductor memory, and can be provided as so-called packaged software. Furthermore, the program can be transmitted to the NFC communication apparatus 1 by near field communication and can be installed into the EEPROM 21B.

A power-supply unit 22 supplies necessary power to the blocks constituting the NFC communication apparatus 1. In FIG. 4, representation of lines showing that the controller 21 controls the blocks constituting the NFC communication apparatus 1, and representation of lines showing that the power-supply unit 22 supplies power to the NFC communication apparatus 1 complicate FIG. 4. Accordingly, the representations are omitted. The power-supply unit 22 may have incorporated therein a battery, or may obtain power that becomes a power source from the electrical current flowing through the antenna 11 without incorporating a battery. However, in the latter case, the NFC communication apparatus 1 operates as only the target in the passive mode.

Although, in the above case, the decoder 14 and the encoder 16 can process the Manchester code, the decoder 14 and the encoder 16 can selectively process not only the Manchester code, but also one of plural types of codes such as modified Miller code and NRZ (Non Return to Zero) code.

Next, all the NFC communication apparatuses 1 to 3 can become initiators that output an electromagnetic wave first and starts communication. Furthermore, in the active mode, in both cases in which the NFC communication apparatuses 1 to 3 are initiators or targets, they output an electromagnetic wave by themselves.

Therefore, when two or more of the NFC communication apparatuses 1 to 3 output electromagnetic waves at the same time in a state in which the NFC communication apparatuses 1 to 3 are in proximity with one another, collisions occur, and communication cannot be performed.

Therefore, each of the NFC communication apparatuses 1 to 3 detects whether or not (an RF field by) an electromagnetic wave from other apparatuses exists. Only when the electromagnetic wave does not exist, the NFC communication apparatus starts to output an electromagnetic wave, thereby preventing collisions. Here, processing in which whether or not an electromagnetic wave from other apparatuses exist is detected and only when it does not exist, the output of an electromagnetic wave is started is called an RFCA (RF Collision Avoidance) process from the purpose of preventing collisions.

There are two types of RFCA process: an initial RFCA process that is performed first by the NFC communication apparatuses (in FIG. 1, one or more of the NFC communication apparatuses 1 to 3) that are going to become initiators; and a response RFCA process that is performed each time an NFC communication apparatus starts to output an electromagnetic wave during communication in the active mode. The initial RFCA process and the response RFCA process are the same in that, before the output of an electromagnetic wave is started, whether or not an electromagnetic wave from other apparatuses exists is detected, and only when it does not exist, the output of the electromagnetic wave is started. However, between the initial RFCA process and the response RFCA process, a time period until a timing at which the output of an electromagnetic wave needs to be started after the presence of the electromagnetic wave output by the other apparatuses is no longer detected differs.

The initial RFCA process will be described first with reference to FIG. 5.

Figure 5:
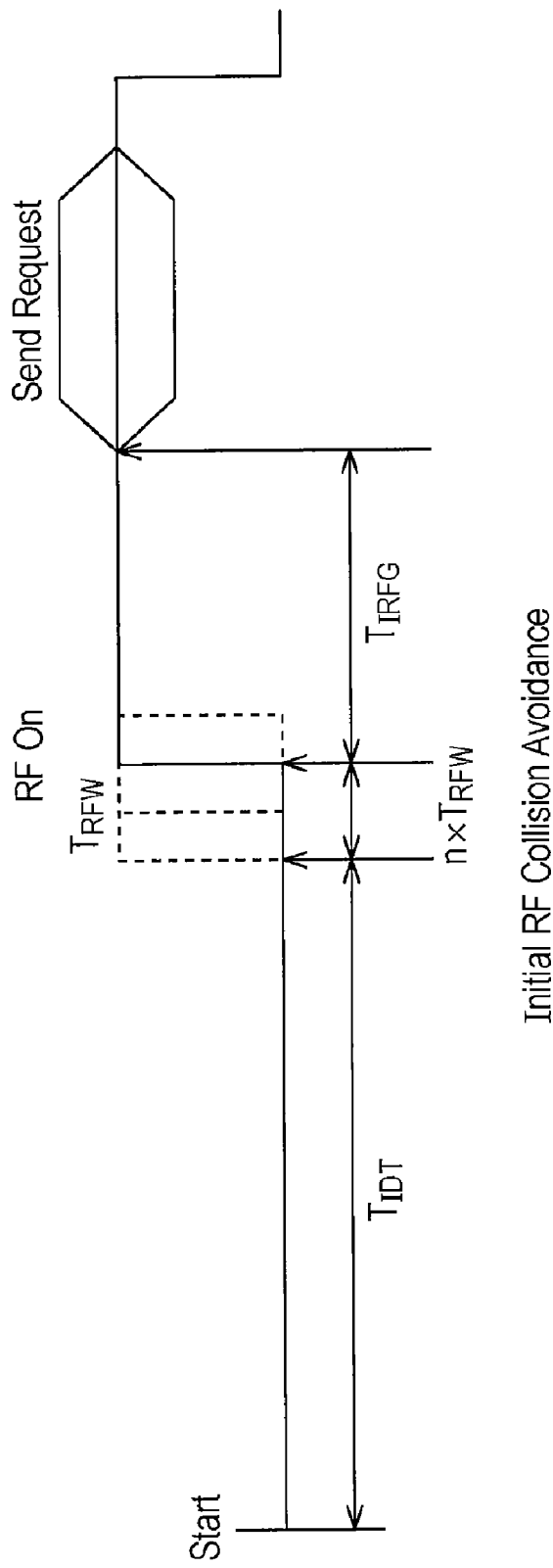
FIG. 5 is a timing chart illustrating an initial RFCA process.

FIG. 5 shows an electromagnetic wave whose output is started by the initial RFCA process. In FIG. 5 (the same applies to FIG. 6 described later), the horizontal axis indicates time, and the vertical axis indicates the level of an electromagnetic wave output by the NFC communication apparatus.

The NFC communication apparatus that is going to be an initiator always detects an electromagnetic wave from another apparatus. When an electromagnetic wave from another apparatus is not detected continuously for a time period $T_{IDT}+n\times T_{RFW}$, the NFC communication apparatus starts to output an electromagnetic wave and starts transmission (Send Request) of data (including a command) after a time period $T_{IRFG}$ has passed after the output.

At this point, $T_{IDT}$ in the time period $T_{IDT}+n\times T_{RFW}$ is called an initial delay time period. When the frequency of the carrier wave is denoted as $f_c$, a value greater than, for example, $4096/f_c$, is used therefor. n is an integer of, for example, of 0 to 3, and is generated using a random number. $T_{RFW}$ is called an RF waiting time and, for example, $512/f_c$ is used. The time $T_{IRFG}$ is called an initial guard time and, for example, a value greater than 5 ms is used.

By using n, which is a random number, for the time period $T_{IDT}+n\times T_{RFW}$ during which an electromagnetic wave should not be detected, the possibility that a plurality of NFC communication apparatuses start to output an electromagnetic wave at the same timing is reduced.

When the NFC communication apparatus starts to output an electromagnetic wave by the initial RFCA process, the NFC communication apparatus becomes an initiator. In that case, when the active mode is set as a communication mode, the NFC communication apparatus that has become an initiator stops outputting the electromagnetic wave after the transmission of the data of the NFC communication apparatus is completed. On the other hand, when the passive mode is set as a communication mode, the NFC communication apparatus that has become an initiator continues, as it is, the output of the electromagnetic wave started by the initial RFCA process until the communication with the target completely ends.

Figure 6:
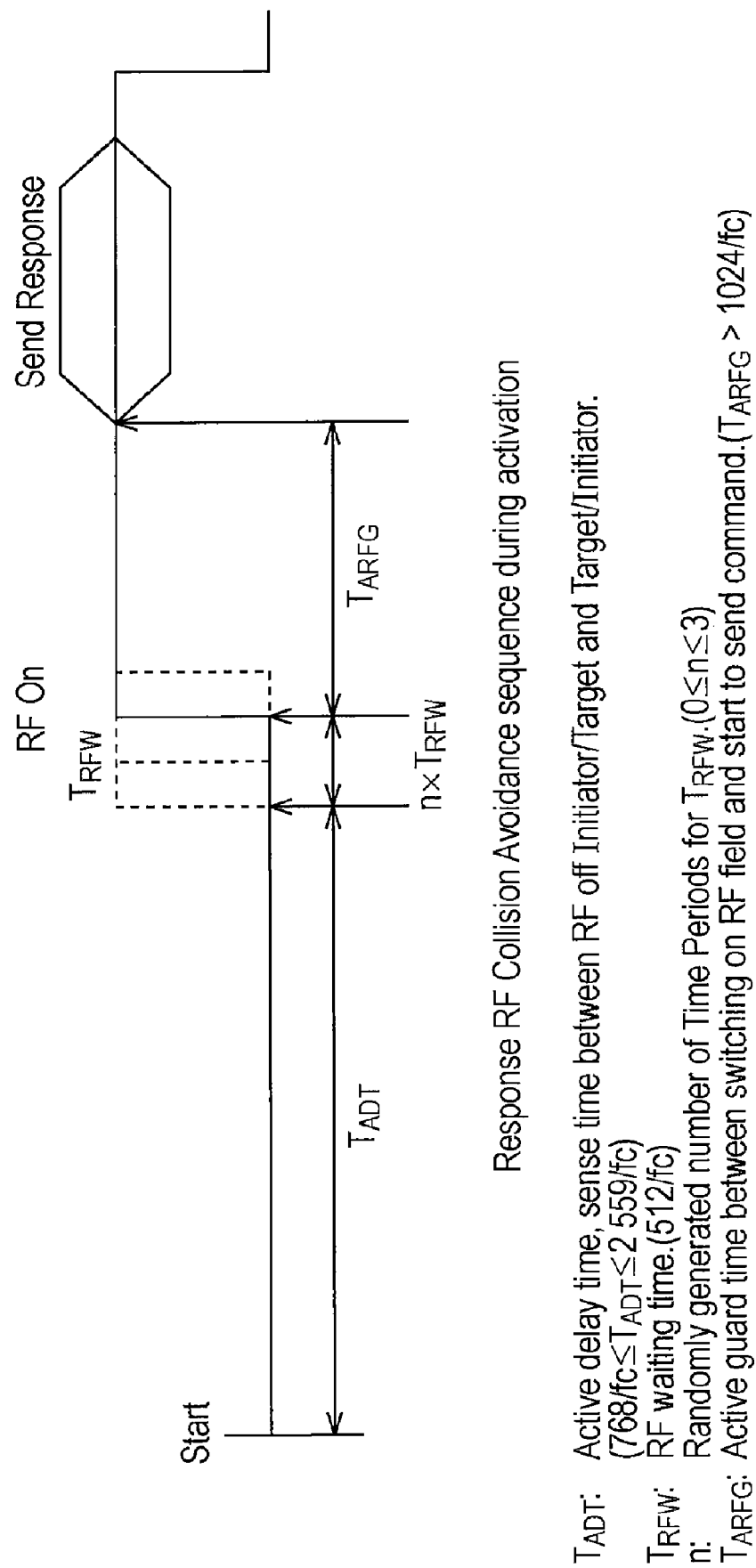
FIG. 6 is a timing chart illustrating an active RFCA process.

Next, FIG. 6 shows an electromagnetic wave whose output is started by a response RFCA process.

The NFC communication apparatus that is going to output an electromagnetic wave in the active mode detects an electromagnetic wave from another apparatus. When an electromagnetic wave from the other apparatus is not detected continuously for a time period $T_{ADT}+n\times T_{RFW}$, the NFC communication apparatus starts to output an electromagnetic wave, and starts the transmission (Send Responses) of data after an elapse of a time $T_{ARFG}$ from the output.

n and $T_{RFW}$ in the time period $T_{ADT}+n\times T_{RFW}$ are the same as those in the case of the initial RFCA process of FIG. 5. $T_{ADT}$ in the time period $T_{ADT}+n\times T_{RFW}$ is called an active delay time, and a value of, for example, greater than or equal to $768/f_c$, and smaller than or equal to $2559/f_c$, is used. The time $T_{ARFG}$ is called an active guard time, and a value of, for example, greater than $1024/f_c$, is used.

As is clear from FIGS. 5 and 6, in order to start to output an electromagnetic wave by the initial RFCA process, an electromagnetic wave should not exist during at least the initial delay time $T_{IDT}$, and in order to start to output an electromagnetic wave by the response RFCA process, an electromagnetic wave should not exist during at least the active delay time $T_{ADT}$.

Whereas the initial delay time $T_{IDT}$ is a value greater than $4096/f_c$, the active delay time $T_{ADT}$ is a value greater than or equal to $768/f_c$ and smaller than or equal to $2559/f_c$. Therefore, when the NFC communication apparatus is going to become an initiator, a state in which an electromagnetic wave does not exist is needed for a time period longer than that when an electromagnetic wave is output during communication in the active mode. To say reversely, when the NFC communication apparatus is going to output an electromagnetic wave during communication in the active mode, an electromagnetic wave needs to be output without taking much delay from when a state in which no electromagnetic wave exists is reached when compared with the case in which the NFC communication apparatus is going to become an initiator. This is due to the following reasons.

That is, when NFC communication apparatuses perform communication in the active mode, one of the NFC communication apparatuses outputs an electromagnetic wave by itself and transmits data, and thereafter stops the output of the electromagnetic wave. Then, the other NFC communication apparatuses start to output an electromagnetic wave and transmits data. Therefore, in the communication of the active mode, all the NFC communication apparatuses may have stopped the output of the electromagnetic wave. For this reason, when the NFC communication apparatus is going to become an initiator, in order to confirm that communication in the active mode is not being performed around that NFC communication apparatus, it is necessary to confirm, for a sufficient time period, the fact that the other apparatuses do not output an electromagnetic wave around the NFC communication apparatus that is going to become an initiator.

In comparison, in the active mode, as described above, the initiator outputs an electromagnetic wave, and thereby transmits data to the target. Then, the target starts to output an electromagnetic wave after the initiator stops the output of the electromagnetic wave, and thereby transmits data to the initiator. Thereafter, the initiator starts the output of the electromagnetic wave after the target stops the output of the electromagnetic wave, and thereby transmits data to the initiator. Hereafter, similarly, data is transmitted and received between the initiator and the target.

Therefore, when an NFC communication apparatus that is going to become an initiator exists around the initiator and the target that are performing communication in the active mode, if the time period from when one of the initiator and the target that are performing communication in the active mode stops the output of the electromagnetic wave until the other starts to output an electromagnetic wave is long, the electromagnetic wave does not exist during the time period. Therefore, the NFC communication apparatus that is going to become an initiator starts the output of the electromagnetic wave by the initial RFCA process.

In this case, the communication in the active mode, which has been performed previously, is impeded.

For this reason, in the response RFCA process that is performed during communication in the active mode, an electromagnetic wave needs to be output without taking much delay after a state in which an electromagnetic wave does not exist is reached.

Next, as described with reference to FIG. 5, the NFC communication apparatus that is going to become an initiator starts the output of the electromagnetic wave by the initial RFCA process and thereafter, transmits data. The NFC communication apparatus that is going to become an initiator starts the output of the electromagnetic wave and thereby becomes an initiator, and an NFC communication apparatus that exists in proximity with the initiator becomes a target. In order for the initiator to transmit and receive data to and from the target, it is necessary to specify the target to and from which data is transmitted and received. For this reason, after the initiator starts the output of the electromagnetic wave by the initial RFCA process, the initiator makes a request for, for example, an NFCID (NFC Identification) determined using a random number or the like as information for specifying each target to one or more targets that exist in proximity with the initiator. Then, the target that exists in proximity with the initiator transmits an NFCID that specifies the target to the initiator in response to a request from the initiator.

The initiator identifies a target on the basis of the NFCID transmitted from the target in the manner described above, and transmits and receives data to and from the specified target.

In the active mode, the initiator transmits a command (request) ATR_REQ (to be described later), with an NFCID that specifies the initiator being contained therein, and one target sends back (transmits) a response ATR_RES (to be described later) for the command ATR_REQ, with an NFCID that specifies the target being contained therein, with the result that the initiator and the target mutually recognize their NFCID and identify each other.

On the other hand, in the passive mode, the initiator performs processing called an SDD (Single Device Detection) process, so that a target that exists around (in proximity with) the initiator is identified using the NFCID.

At this point, in the SDD process, the initiator makes a request for the NFCID of the target. This request is made by the initiator by transmitting a frame called a polling request frame. When the target receives the polling request frame, the target determines, for example, its own NFCID using a random number and transmits a frame called a polling response frame in which the NFCID is located. The initiator recognizes the NFCID of the target by receiving the polling response frame transmitted from the target.

Since the target in the passive mode transmits data by load modulation, the RFCA process is not performed. Therefore, in the SDD process, when the initiator makes a request for the NFCID to targets around the initiator, it can occur that when a plurality of targets exist around the initiator, NFCIDs are transmitted simultaneously from two or more of the targets.

In this case, NFCIDs that are transmitted from the two or more targets collide one another, and it is not possible for the initiator to recognize the colliding NFCIDs.

Accordingly, the SDD processing is performed by, for example, a method using time slots in order to avoid collisions of NFCIDs as much as possible.

Figure 7:
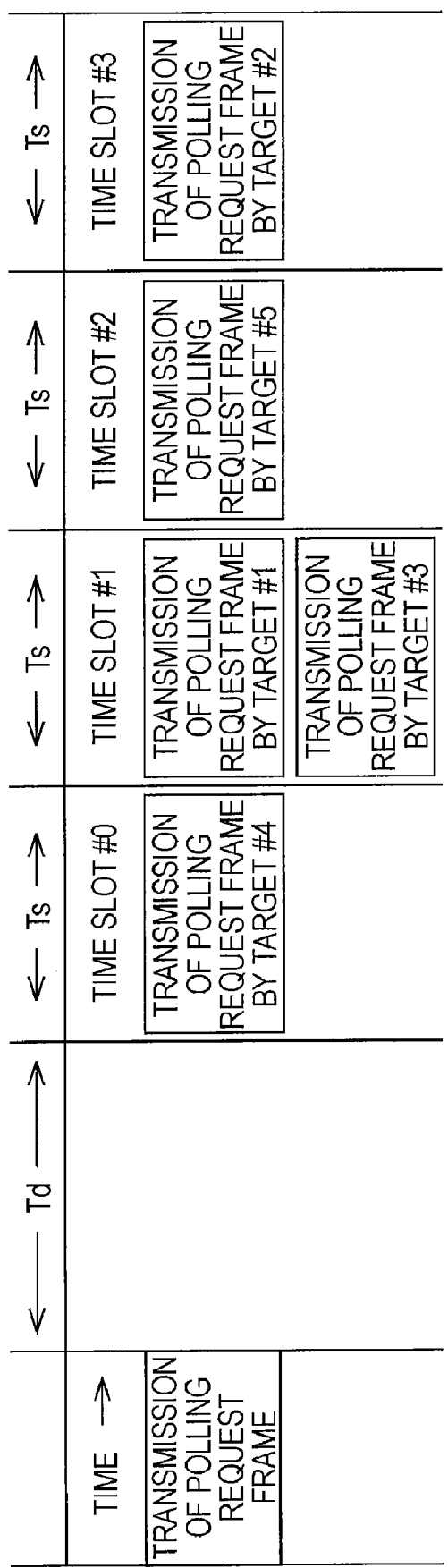
FIG. 7 illustrates an SDD process.

FIG. 7 shows an SDD processing sequence performed by a method using time slots. In FIG. 7, it is assumed that five targets #1, #2, #3, #4, and #5 exist around an initiator.

In the SDD processing, the initiator transmits a polling response frame. After completion of the transmission, time slots at intervals of a predetermined time period $T_s$ are provided after an elapse of a predetermined time period $T_d$. The time period $T_d$ is set to, for example, $512\times64/f_c$, and the time period $T_s$ as the time slot interval is set to, for example, $256\times64/f_c$. Also, the time slots are sequentially numbered (integer) from zero from, for example, the temporally preceding slot, whereby they are identified.

Although FIG. 7 shows four time slots #0, #1, #2, and #3, for example, up to sixteen time slots can be set. The number TSN of time slots, set for a certain polling response frame, is designated by the initiator, and is transmitted, with the number TSN of time slots being contained in the polling response frame, to a target.

The target receives the polling response frame transmitted from the initiator, and recognizes the number TSN of time slots. The target uses random numbers to generate an integer R in the range of zero to TSN-1, and transmits a polling response frame in which its NFCID is located, at the timing of the time slot #R determined by the integer R.

As described above, based on random numbers, the target determines time slots used as timing for transmitting polling response frames. Thus, the timing at which the targets transmit polling response frames varies. This can avoid collisions of the polling response frames transmitted by the targets as much as possible.

Even if each target determines, based on a random number, a time slot as timing for transmitting a polling response frame, time slots in which polling response frames are transmitted by a plurality of targets may coincide with one another. This may cause collisions of the polling response frames. In the embodiment in FIG. 7, a polling response frame of target #4 is transmitted in time slot #0, polling response frames of targets #1 and #3 are transmitted in time slot #1, a polling response frame of target #5 is transmitted in time slot #2, and a polling response frame of target #3 is transmitted in time slot #3, so that the collision between targets #1 and #3 occurs.

In this case, the initiator cannot normally receive the polling response frames of targets #1 and #3 between which the collision occurs. Accordingly, the initiator transmits a polling request frame again. This requests targets #1 and #3 to transmit polling response frames in which their NFCIDs are located. Subsequently, until the initiator recognizes all the NFCIDs of targets #1 to #5 around it, transmission of polling request frames by the initiator and transmission of polling response frames by the targets are repeatedly performed.

In a case in which, when the initiator transmits a polling request frame again, all the targets #1 to #5 can send back polling response frames, there is a possibility that polling response frames may collide with each other. Accordingly, in a case in which, after each target receives a polling request frame from the initiator, the target receives a polling request frame again without taking much time, for example, the target can ignore the polling request frame. However, in this case, in the embodiment in FIG. 7, regarding the targets #1 and #3, in which polling response collision occurs for the initially transmitted polling request frame, the initiator cannot recognize the NFCIDs of the targets #1 and #3. Thus, data exchange cannot be performed between the targets #1 and #3.

Accordingly, targets #2, #4, and #5, in which their polling response frames are normally received and their NFCIDs can be recognized, are temporarily excluded (placed in a deselected state) from parties among which communication is performed, whereby a polling response frame as a response to the polling request frame cannot be sent back. In this case, those which send back polling response frames to the polling request frame retransmitted by the initiator are only targets #1 and #3, whose NFCIDs cannot be recognized through the transmission of the initial polling request frame. Therefore, in this case, all the NFCIDs of targets #1 to #5 can be recognized while reducing a possibility that polling response frames may collide with each other.

In addition, here, as described above, when a polling request frame is received, the target determines (generates) its NFCID based on random numbers. Accordingly, from different targets, polling response frames with identical NFCIDs located therein may be transmitted to the initiator. When the initiator receives, in different time slots, the polling response frames with identical NFCIDs located therein, the initiator can retransmit a polling request frame, for example, similarly to a case in which polling response frames collide with each other.

As described above, according to NFC communication apparatuses, even between an IC card and a reader/writer constituting the existing IC card system, data can be exchanged at transmission rates employed by the IC card and the reader/writer. When a target is, for example, an IC card in the existing IC card system, SDD processing is performed in, for example, the following manner.

More specifically, in accordance with the initial RFCA process, an initiator starts to output an electromagnetic wave, and an IC card as a target obtains power from the electromagnetic waves and initiates processing. In other words, in this case, the target generates operating power from the electromagnetic waves output by the initiator since it is an IC card in the existing IC card system.

After obtaining the power and being operable, the target prepares for receiving a polling request frame within, for example, a maximum of 2 seconds, and waits for the polling request frame to be transmitted from the initiator.

On the other hand, the initiator can transmit a polling request frame regardless of whether or not the preparation for receiving the polling request frame is completed in the target.

When the target receives the polling request frame from the initiator, as described above, the target transmits a polling response frame to the initiator at a timing of a predetermined time slot. When the initiator successfully receives the polling response frame from the target, as described above, it recognizes the NFCID of the target. Also, when the initiator fails to normally receive the polling response frame from the target, the initiator can retransmit a polling request frame.

In this case, the target generates operating power from electromagnetic waves output by the initiator since it is an IC card in the existing IC card system. Accordingly, the initiator continues the electromagnetic wave output initiated by the initial RFCA processing until communication with the target completely ends.

Next, according to NFC communication apparatuses, communication is performed such that an initiator transmits a command to a target, and the target transmits (sends back) a response to the command from the initiator.

Accordingly, FIG. 8 shows commands that the initiator transmits to the target, and responses that the target transmits to the initiator.

In FIG. 8, those having the characters REQ after the underbar (_) represent commands, and those having the characters RES after the underbar (_) represent responses. In the embodiment in FIG. 8, six types of commands, ATR_REQ, WUP_REQ, PSL_REQ, DEP_REQ, DSL_REQ, and RLS_REQ, are available. Similarly to the commands, also six types of responses, ATR_RES, WUP_RES, PSL_RES, DEP_RES, DSL_RES, and RLS_RES, are available. As described above, an initiator transmits a command (request) to a target, and the target transmits to the initiator a response to the command. Accordingly, the command is transmitted by the initiator, and the response is transmitted by the target.

The command ATR_REQ is such that the initiator notifies the target of its attributes (specifications) and is transmitted to the target when the initiator requests target's attributes. Here, the attributes of the initiator or the target include the transmission rate of data that can be transmitted or received by the initiator or the target. In the command ATR_REQ, in addition to initiator's attributes, an NFCID identifying the initiator is located, and the target recognizes the initiator's attributes and NFCID by receiving the command ATR_REQ.

The response ATR_RES is transmitted as a response to the command ATR_REQ to the initiator when the target receives the command ATR_REQ. In the response ATR_RES, attributes, an NFCID, etc., of the target are located.

Transmission rate information as an attribute located in the command ATR_REQ and the response ATR_RES can include all the transmission rates of data which can be transmitted and received by the initiator and the target. In this case, by exchanging the command ATR_REQ and the response ATR_RES once between the initiator and the target, the initiator can recognize a transmission rate at which the target can perform transmission and reception, and the target can also recognize a transmission rate at which the initiator can perform transmission and reception.

A command WUP_REQ is transmitted when the initiator selects a target with which the initiator will communicate. Specifically, by transmitting a command DSL_REQ, which is described later, from the initiator to the target, the target can set to be in a deselected state (a state in which transmission (response) of data to the initiator is prohibited). The command WUP_REQ is transmitted in the case of releasing the deselected state and setting the target to be in a state capable of transmitting data to the initiator. In the command WUP_REQ, the NFCID of the target whose deselected state is to be released is located. Among targets having received the command WUP_REQ, a target which is identified by the NFCID located in the received command WUP_REQ releases its deselected state.

When, among the targets having received the command WUP_REQ, the target that is identified by the NFCID located in the received command WUP_REQ releases its deselected state, the response WUP_RES is transmitted as a response to the command WUP_REQ.

The command WUP_REQ is transmitted only when the initiator is in the active mode, and the response WUP_RES is transmitted only when the target is in the active mode.

A command PSL_REQ is transmitted when the initiator changes communication parameters concerning communication with the target. Here, the communication parameters include, for example, the transmission rate of data exchanged between the initiator and the target.

The command PSL_REQ includes the value of a changed communication parameter located therein, and is transmitted from the initiator to the target. The target receives the command PSL_REQ, and changes its communication parameter in accordance with the value of the communication parameter located in the command. The target further transmits a response PSL_RES to the command PSL_REQ.

A command DEP_REQ is transmitted when the initiator performs transmission and reception (data exchange with the target) of data (so-called real data). In this command, data to be transmitted to the target is located. The response DEP_RES is transmitted as a response to the command DEP_REQ. In this command, data to be transmitted to the initiator is located. Accordingly, the command DEP_REQ allows data to be transmitted from the initiator to the target, and the response DEP_RES to the command DEP_REQ allows data to be transmitted from the target to the initiator.

The command DSL_REQ is transmitted when the initiator sets the target to be in the deselected state. The target having received the command DSL_REQ transmits the response DSL_RES to the command DSL_REQ and enters the deselected state, and subsequently becomes not responsive (comes to send back no response) to commands other than the command WUP_REQ.

A command RLS_REQ is transmitted when the initiator completely ends the communication with the target. The target, which has received the command RLS_REQ, transmits the response RLS_RES to the command RLS_REQ, and completely ends the communication with the initiator.

At this point, both the commands DSL_REQ and RLS_REQ are common in excluding a target from parties communicating with the initiator. However, the target excluded by the command DSL_REQ is set to be communicatable with the initiator again by the command WUP_REQ. However, the target excluded by the command RLS_REQ does not become communicatable with the initiator unless the initiator re-performs processing starting from the initial RFCA process. In that point, the commands DSL_REQ and RLS_REQ differ from each other.

Next, the communication of the NFC communication apparatus is performed in accordance with NFCIP-1 defined as ISO/IEC 18092.

Accordingly, a communication process in accordance with NFCIP-1 will be described with reference to FIGS. 9 to 11.

Figure 9:
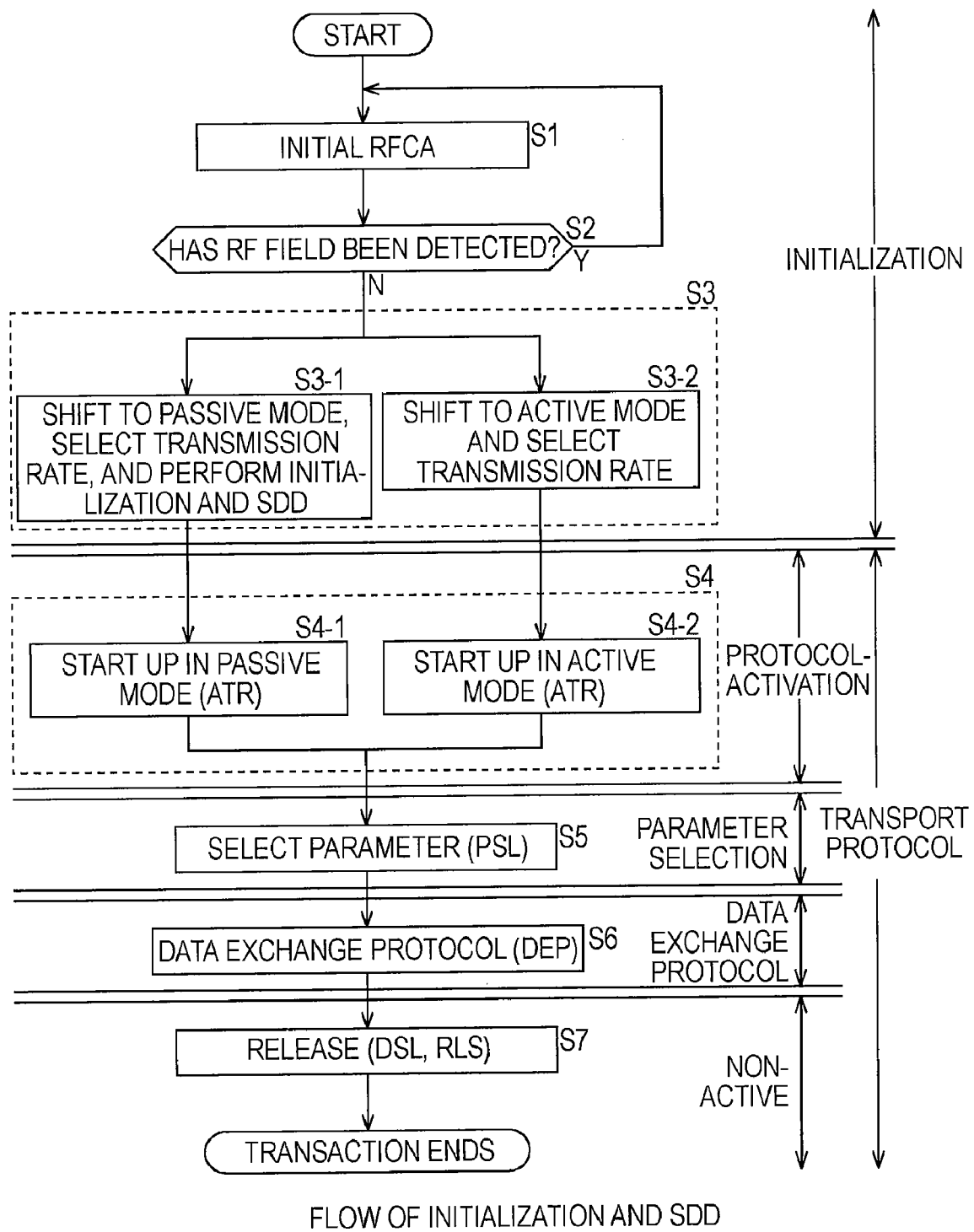
FIG. 9 is a flowchart illustrating the outline of a communication process in accordance with NFCIP-1.

FIG. 9 is a flowchart illustrating the outline of a communication process in accordance with NFCIP-1.

At first, in step S1, an NFC communication apparatus serving as an initiator performs an initial RFCA process and proceeds to step S2. In step S2, it is determined whether or not the NFC communication apparatus serving as an initiator has detected an RF field by the initial RFCA processing of step S1. When it is determined in step S2 that the RF field has been detected, the process returns to step S1, and subsequently similar processing is repeated. That is, the NFC communication apparatus serving as an initiator does not form an RF field so as not to impede communication by other NFC communication apparatuses that have formed the RF field while the RF field is being detected.

On the other hand, when it is determined in step S2 that the RF field has not been detected, the NFC communication apparatus selects one of the communication modes of the active mode and the passive mode. The process then proceeds to step S3, where the NFC communication apparatus functions as an initiator and selects, for example, a transmission rate.

That is, in the NFCIP-1, it is possible to select, for example, a transmission rate used for actual communication from among a plurality of transmission rates, such as 106 kbps, 212 kbps, and 424 kbps. Accordingly, in step S3, the NFC communication apparatus serving as an initiator selects a transmission rate.

More specifically, in the case of performing passive mode communication, the NFC communication apparatus proceeds from step S2 to step S3-1 between steps S3-1 and S3-2 forming step S3, becomes an initiator, changes the communication mode to the passive mode, and selects a transmission rate. Also, in step S3-1, the NFC communication apparatus performs predetermined initialization and SDD processing, and proceeds to step S4-1 between steps S4-1 and S4-2 forming step S4.

In step S4-1, the NFC communication apparatus is activated (starts up) in the passive mode, exchanges the command ATR_REQ and the response ATR_RES with the target in the passive mode, and proceeds to step S305.

Alternatively, in the case of performing active mode communication, the NFC communication apparatus proceeds from step S2 to step S3-2 between steps S3-1 and S3-2 forming step S3, becomes an initiator, changes the communication mode to the active mode, selects the transmission rate, and proceeds to step S4-2 between steps S4-1 and S4-2 forming step S4.

In step S4-2, the NFC communication apparatus is activated in the active mode, exchanges the command ATR_REQ and the response ATR_RES with the target, and proceeds to step S305.

In step S5, when a communication parameter (for example, a transmission rate) required for communication needs to be changed from the current communication parameter, the NFC communication apparatus selects the communication parameter, exchanges the command PSL_REQ and the response PSL_RES in which the communication parameter and the like are located with the target, changes the communication parameter, and proceeds to step S306.

In step S6, the NFC communication apparatus exchanges the command DEP_REQ and the response DEP_RES with the target in accordance with the communication parameter selected in step S5, performs data exchange (communication) based on a data exchange protocol in accordance with the communication parameter selected in step S305, ends the data exchange, and then proceeds to step S307. In step S307, the NFC communication apparatus exchanges the command DSL_REQ and the response DSL_RES, or the command RSL_REQ and the response RSL_RES with the target, is deactivated, and ends the transaction.

The NFC communication apparatus can be set by default to be, for example, a target. The NFC communication apparatus, which is set to be the target, forms no RF field, and is on standby until a command is transmitted from the initiator (until the initiator forms an RF field).

Also, the NFC communication apparatus can become an initiator, for example, in accordance with a request from an application. For example, an application can determine which one of the active mode and the passive mode the communication mode is, and can select (determine) the transmission rate.

The NFC communication apparatus, which becomes the initiator, forms an RF field if no RF field is formed in the exterior, and the target is activated by the RF field formed by the initiator.

After that, the initiator transmits the command in the selected communication mode and the transmission rate, and the target sends back (transmits) a response at a communication mode and a transmission rate identical to those of the initiator.

Next, a description will be given, with reference to the flowchart in FIG. 10, of processing of an activation protocol in a passive mode (processing performed by an NFC communication apparatus in order to perform data exchange in the passive mode).

At first, in step S11, the initiator performs an initial RFCA process, and the process then proceeds to step S12, where the communication mode is set to be a passive mode. Then, the process proceeds to step S13, where the initiator performs an initialization process and an SDD process, and selects a transmission rate.

At this point, the processing of step S11 corresponds to the processing of steps S1 and S2 of FIG. 9, and the processing of steps S12 and S13 corresponds to the processing of step S3 (S3-1) of FIG. 9.

Thereafter, the process proceeds to step S14, where the initiator determines whether or not a request for attributes should be made to the target. Here, the term attributes is information on the specification of the NFC communication apparatus, and examples thereof include information on the transmission rate that can be handled by the NFC communication apparatus.

When it is determined in step S14 that a request for attributes should not be made to the target, the process proceeds to step S335, where the initiator performs communication with the target in accordance with its unique protocol. Then, the process returns to step S14 and subsequently, similar processing is repeated.

When it is determined in step S14 that a request for attributes should be made to the target, the process proceeds to step S16, where the initiator transmits a command ATR_REQ, thereby making a request for attributes to the target. Then, the initiator waits for a response ATR_RES to the command ATR_REQ to be transmitted from the target, and the process proceeds to step S17, where the response ATR_RES is received. Then, the process proceeds to step S18.

At this point, the processing of steps S16 and S17 corresponds to the processing of step S4 (S4-1) of FIG. 9.

In step S18, on the basis of the response ATR_RES received from the target in step S17, the initiator determines whether or not the communication parameter, that is, for example, a transmission rate, can be changed. When it is determined in step S18 that the transmission rate cannot be changed, steps S19 to S21 are skipped, and the process proceeds to step S22.

When it is determined in step S18 that the transmission rate can be changed, the process proceeds to step S19, where the initiator transmits the command PSL_REQ, thereby requesting the target to change the transmission rate. Then, the initiator waits for a response PSL_RES to the command PSL_REQ to be transmitted from the target, and the process proceeds from step S19 to step S20, where the response PSL_RES is received. Then, the process proceeds to step S21. In step S21, the initiator changes the communication parameter, that is, for example, the transmission rate, in accordance with the response PSL_RES received in step S20, and the process proceeds to step S22.

At this point, the processing of steps S18 to S21 corresponds to the processing of step S5 of FIG. 9.

In step S22, the initiator performs data exchange, that is, exchange of the command DEP_REQ and the response DEP_RES, with the target in accordance with a data exchange protocol.

At this point, the processing of step S22 corresponds to the processing of step S6 of FIG. 9.

After data conversion has been performed in step S22, the initiator proceeds to step S23 or S25 as necessary.

That is, when the initiator sets the target to be in a deselected state, the process proceeds from step S22 to step S23, and the initiator transmits a command DSL_REQ. Then, the initiator waits for a response DSL_RES to the command DSL_REQ to be transmitted from the target and proceeds from step S23 to step S24, where the response DSL_RES is received. The process then returns to step S14 and subsequently, similar processing is repeated.

On the other hand, when the initiator completely ends the communication with the target, the process proceeds from step S22 to step S25, where the command RLS_REQ is transmitted. Then, the initiator waits for the response RLS_RES to the command RLS_REQ to be transmitted from the target, and the process then proceeds from step S25 to step S26, where the response RLS_RES is received. Then, the process returns to step S11 and subsequently, similar processing is repeated.

At this point, the processing of steps S23 and S24 and the processing of steps S25 and S26 correspond to the processing of step S7 of FIG. 9.

Next, a description will be given, with reference to the flowchart in FIG. 11, of an activation protocol in the active mode.

At first, in step S31, the initiator performs an initial RFCA process, and the process then proceeds to step S32, where the initiator sets the communication mode to an active mode and selects the transmission rate.

Here, the processing of step S31 corresponds to the processing of steps S1 and S2 of FIG. 9, and the processing of step S32 corresponds to the processing of step S3 (S3-2).

Figure 10:
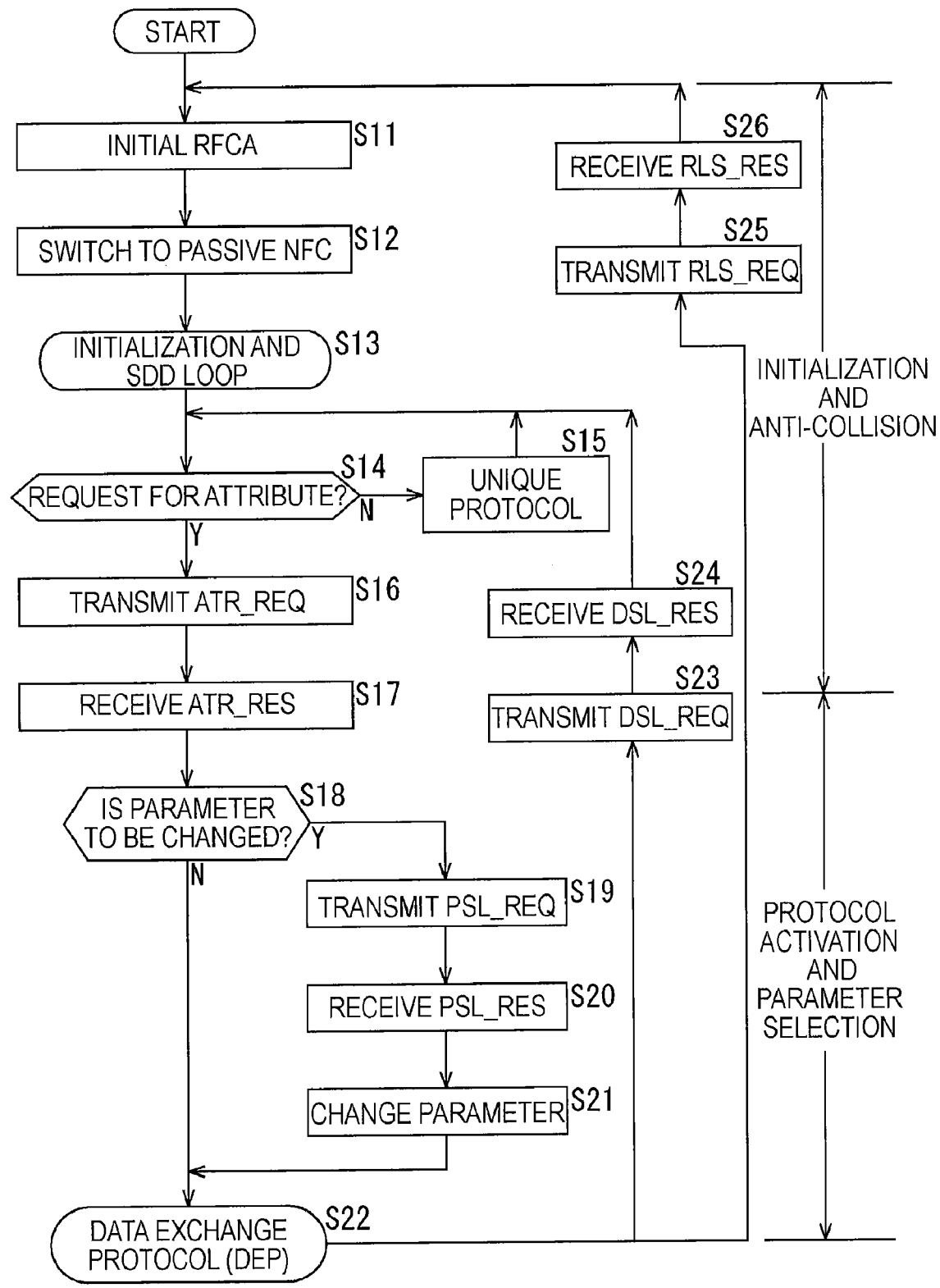
FIG. 10 is a flowchart illustrating processing performed in a passive mode.

Thereafter, in steps S33 to S39, processes similar to those in steps S16 to S22 of FIG. 10 are performed, respectively.

That is, in step S33, the initiator transmits a command ATR_REQ, thereby making a request for attributes to the target. Then, the initiator waits for a response ATR_RES to the command ATR_REQ to be transmitted from the target, and the process proceeds to step S34, where the response ATR_RES is received. The process then proceeds to step S35.

In step S35, on the basis of the response ATR_RES received from the target in step S34, the initiator determines whether or not the communication parameter, that is, for example, the transmission rate, can be changed. When it is determined in step S35 that the transmission rate cannot be changed, the initiator skips steps S36 to S38 and proceeds to step S39.

When it is determined in step S35 that the transmission rate cannot be changed, the process proceeds to step S36, where the initiator transmits the command PSL_REQ, thereby requesting the target to change the transmission rate. Then, the initiator waits for the response PSL_RES to the command PSL_REQ to be transmitted from the target, and the process proceeds from step S36 to step S37, where the response PSL_RES is received. The process then proceeds to step S38. In step S38, the initiator changes the communication parameter, that is, for example, the transmission rate, in accordance with the response PSL_RES received in step S37, and the process then proceeds to step S39.

In step S39, the initiator performs data exchange, that is, exchange of the command DEP_REQ and the response DEP_RES, with the target in accordance with a data exchange protocol.

At this point, the processing of steps S33 and S34 corresponds to the processing of step S4 (S4-2) of FIG. 9, and the processing of steps S35 to S38 corresponds to the processing of step S5 of FIG. 9. The processing of step S39 corresponds to the processing of step S6 of FIG. 9.

After the data conversion in step S39, the process proceeds to step S40 or S44 as necessary.

That is, when the initiator sets the target with which communication is being performed to a deselected state and causes one of the targets that have already been set in a deselected state to wake up, the process proceeds from step S39 to step S40, where the command DSL_REQ is transmitted to the target to be set in a deselected state. Then, the initiator waits for the response DSL_RES to the command DSL_REQ to be transmitted from the target, and the process proceeds from step S40 to step S41, where the response DSL_RES is received. Here, the target having transmitted the response DSL_RES enters a deselected state.

Thereafter, the process proceeds from step S41 to step S42, where the initiator transmits a command WUP_REQ to the target to be waked up. Then, the initiator waits for a response WUP_RES to the command WUP_REQ to be transmitted from the target, and the process proceeds from step S42 to step S43, where the response WUP_RES is received. The process then returns to step S35. Here, the target having transmitted the response WUP_RES wakes up, and the waked-up target becomes an object for which the processing of step S35 and subsequent steps should be performed thereafter by the initiator.

On the other hand, when the initiator completely ends communication with the target, the process proceeds from step S39 to step S44, where the command RLS_REQ is transmitted. Then, the initiator waits for a response RLS_RES to the command RLS_REQ to be transmitted from the target, and the process proceeds from step S44 to step S45, where the response RLS_RES is received. The process then returns to step S31 and subsequently, similar processing is repeated.

At this point, the processing of steps S40 to 43 and the processing of steps S44 and S45 correspond to the processing of step S7 of FIG. 9.

Next, a description will be given of the relationship between NFCIP-1 and an OSI (Open System Interconnection) reference model.

Figure 12:
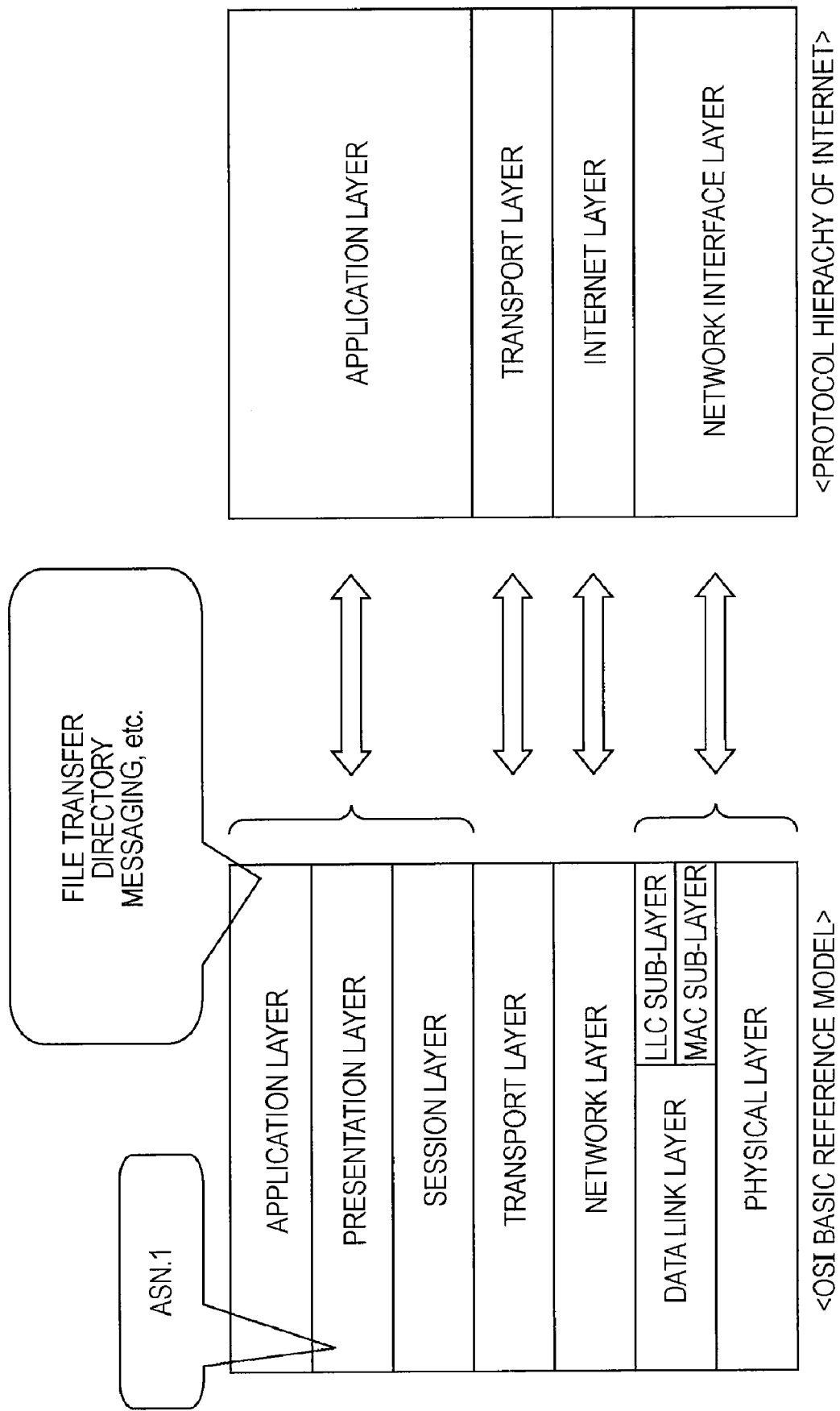
FIG. 12 shows an OSI reference model.

FIG. 12 shows an OSI reference model. In FIG. 12, the left side shows an OSI reference model, and the right side shows a protocol hierarchy of the Internet that has become popular in the world at present.

The OSI reference model is a structural model of 7 hierarchical layers, which serve as standards when a network protocol is constructed. The following are defined from the lowest-order layer (first layer) toward (the higher-order layers): a physical layer (first layer), a data link layer (second layer), a network layer (third layer), a transport layer (fourth layer), a session layer (fifth layer), a presentation layer (sixth layer), and an application layer (seventh layer).

For the data link layer, two sub-layers exist. The higher-order sub-layer between the two sub-layers is an LLC (Logical link control) layer, and the lower-order sub-layer is an MAC (Media Access Control) layer.

On the other hand, as the protocol hierarchy of the Internet, a network interface layer, an Internet layer, a transport layer, and an application layer are defined from the lowest-order layer. The network interface layer of the Internet corresponds to the physical layer and the data link layer of an OSI reference model. The Internet layer of the Internet corresponds to the network layer of the OSI reference model, and the transport layer of the Internet corresponds to the transport layer of the OSI reference model. The application layer of the Internet corresponds to the session layer, the presentation layer, and the application layer of the OSI reference model.

NFCIP-1 defines a physical layer and a data link layer of an OSI reference model. However, in the current NFCIP-1, for the data link layer, only the MAC layer between the LLC layer and the MAC layer, which are the two sub-layers thereof, is defined.

Figure 11:
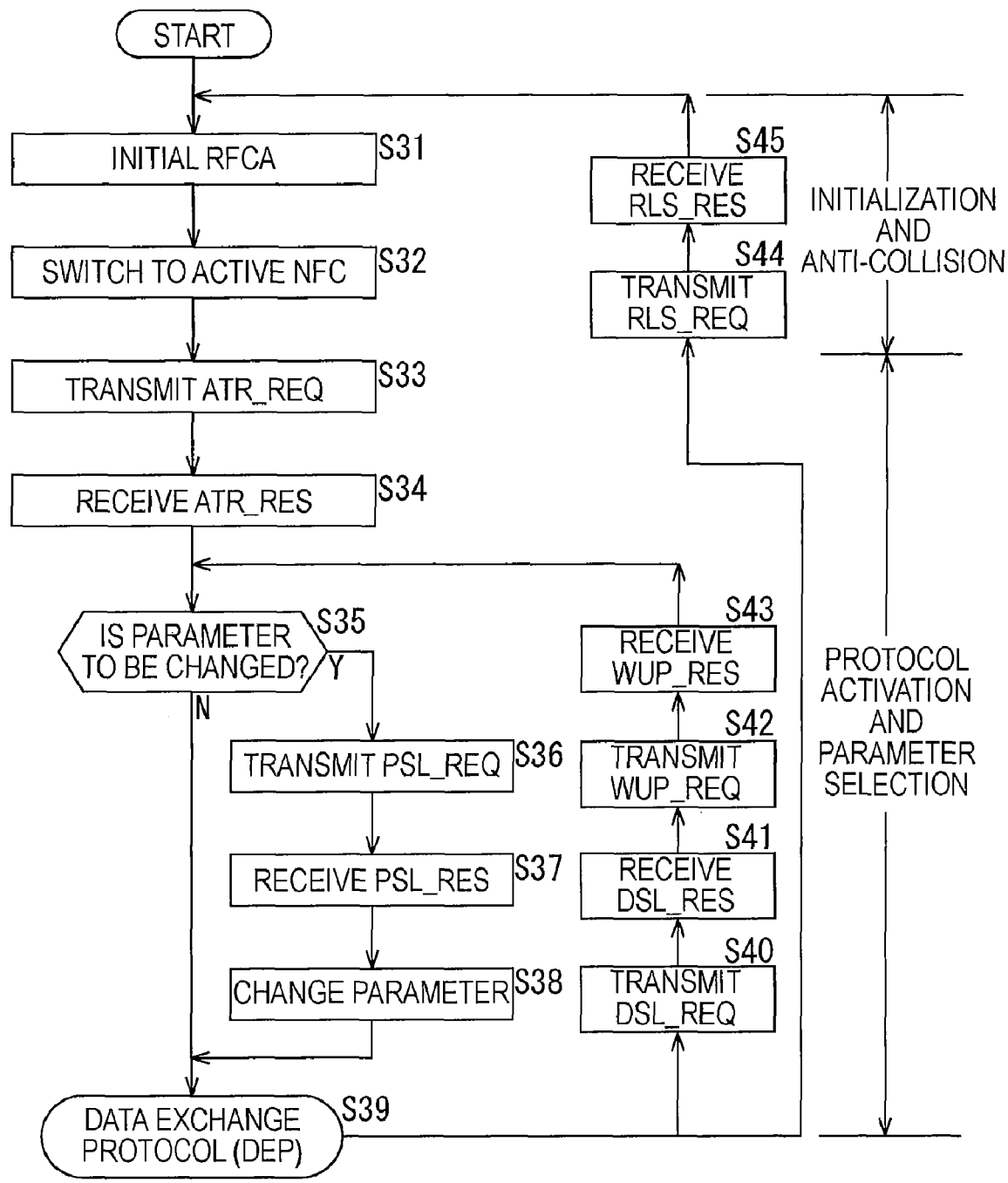
FIG. 11 is a flowchart illustrating processing performed in an active mode.

NFC communication apparatuses exchange a command DEP_REQ and a response DEP_RES in the data exchange of step S6 of FIG. 9 (step S22 of FIG. 10, step S39 of FIG. 11). That is, the initiator transmits a command DEP_REQ, and the target receives the command DEP_REQ. Also, the target transmits a response DEP_RES to the command DEP_REQ, and the initiator receives the response DEP_RES.

The initiator and the target that are NFC communication apparatuses exchange the command DEP_REQ and the response DEP_RES by using packets of the physical layer (hereinafter referred to as "physical layer packets" as appropriate), which are defined by NFCIP-1.

In the physical layer packet, packets (hereinafter referred to as "MAC packets" as appropriate) of a layer higher than the physical layer, that is, the MAC layer that is a lower sub-layer of the data link layer, which are defined by NFCIP-1, are capsulized. Furthermore, in the MAC packet, packets (hereinafter referred to as "LLC packets") of a layer higher than the MAC layer, that is, the LLC layer that is a higher sub-layer of the data link layer, are capsulized.

Figure 13:
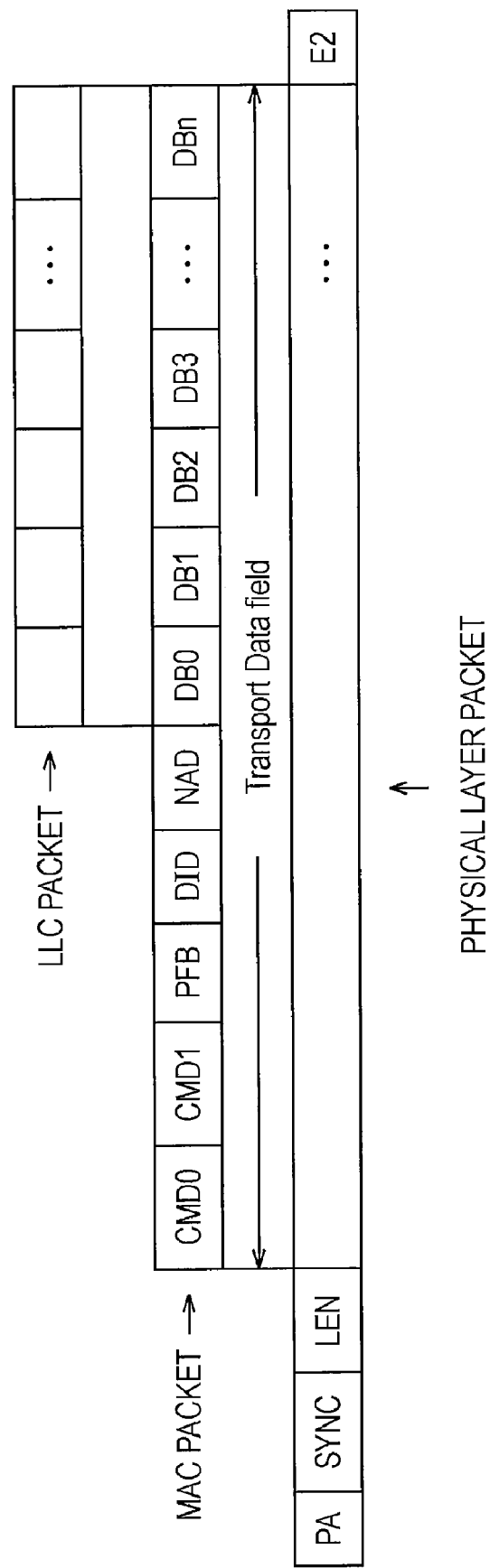
FIG. 13 shows the format (structure) of an MAC packet and a physical layer packet.

FIG. 13 shows the relationship of such capsulization as that described above, and the format of each of the MAC packet and the physical layer packet defined by NFCIP-1.

In FIG. 13, an LLC packet, with a CMD0 field, a CMD1 field, a PFB field, a DID field, and a NAD field being attached thereto, is capsulized, and thereby an MAC packet is formed. Furthermore, the MAC packet, with a PA field, an SYNC field, an LEN field, and an E2 field being attached thereto, is capsulized, and thereby a physical layer packet is formed.

At this point, in the NFC communication apparatus, an LLC packet is capsulized in an MAC packet. The MAC packet is capsulized in a physical layer packet, and the physical layer packet is transmitted in the active mode or in the passive mode, and control thereof is performed by the controller 21. Furthermore, in the NFC communication apparatus, the physical layer packet that is transmitted in the manner described above is received in the active mode or in the passive mode. Also, control thereof is performed by the controller 21.

In NFCIP-1, the physical layer packet is configured in such a manner that, starting from the beginning, a PA field, a SYNC field, an LEN field, a transport data field, and an E2 field are arranged in sequence.

A preamble is located in the PA field, and a predetermined synchronous pattern (synchronous pattern bytes) is located in the SYNC field. A value equivalent to 1 added to the number of bytes of data located in the transport data field is located in the LEN field. In NFCIP-1, the value to be located in the LEN field is assumed to be in the range of 3 to 255. Therefore, when 255 is located in the LEN field, the size of the physical layer packet becomes maximum. In that case, the size of the data to be located in the transport data field, that is, the maximum amount of data that can be located in the transport data field of the physical layer packet, is 254 (=255−1) bytes.

An MAC packet, which is data of the higher-order layer, is located in the transport data field. Code for detecting an error of the physical layer packet, for example, CRC (Cyclic Redundancy Checking) code, is located in the E2 field.

At this point, as described above, in NFCIP-1, it is possible to select a transmission rate used for actual communication from among the transmission rates of 106, 212, and 424 kbps.

The physical layer packet shown in FIG. 13 is used in communication at a transmission rate of 212 or 424 kbps. For communication at a transmission rate of 106 kbps, a physical layer packet provided with an SB field in which a predetermined start byte is located in place of the PA field and the SYNC field of FIG. 13 is used.

Next, in NFCIP-1, the MAC packet (the MAC packet as the command DEP_REQ or the response DEP_RES) is configured in such a manner that, starting from the beginning, a CMD0 field, a CMD1 field, a PFB field, a DID field, an NAD field, and DB0, DB1, . . . , and DBn fields, which are data fields of n+1 bytes, are located.

A value indicating a command DEP_REQ or a response DEP_RES is located in the 1-byte CMD0 field and in the 1-byte CMD1 field.

PFB information (control information for transaction) for data transfer control and error recovery is located in the 1-byte PFB field.

At this point, in data exchange during exchanging of the command DEP_REQ and the response DEP_RES, there are cases in which three types of data are transmitted and received, that is, data requested by an application or the like is transmitted and received, ACK (AcKnowledge) or NACK (Negative AcKnowledge) is transmitted and received, or data for managing the NFC communication apparatus is transmitted and received. The format of (the PFB information located in) the PFB field differs depending on each case.

DID (Device ID) information differing from NFCID, which identifies an NFC communication apparatus for transmitting MAC packets, is located in the 1-byte DID field. That is, in NFCIP-1, the NFCID is set to be a maximum length of 10 bytes. Since the 10-byte NFCID is long, 1-byte DID information can be used as a so-called alias for identifying an NFC communication apparatus.

NAD (Node Address) information used in logical connections is located in the 1-byte NAD field.

An LLC packet, which is data of a higher-order layer, is located in the DB0, DB1, . . . , and DBn fields, which are data fields of n+1 bytes.

Next, FIG. 14 shows PFB information located in the PFB field of FIG. 13 when data requested by an application is transmitted and received in data exchange in which a command DEP_REQ and a response DEP_RES are exchanged.

All higher-order 3 bits, that is, all bits 7, 6, and 5, of the PFB information located in the MAC packet when data requested by an application is transmitted and received, are set to 0. Furthermore, in the fourth bit from the highest order, that is, in bit 4, a 1-bit MI (Multiple Information link for Data Exchange Protocol) flag indicating whether or not there are succeeding MAC packets is located.

At this point, the MI flag is set to 1 when there are succeeding MAC packets and is set to 0 when there are no succeeding MAC packets.

In bits 3 and 2, which are the fifth and sixth bits from the highest order of the PFB information located in the MAC packet when data requested by an application is transmitted and received, an NAD flag and a DID flag are located, respectively. The NAD flag is set to 1 when information of the NAD field of the MAC packet (FIG. 13) is valid and is set to 0 when it is invalid. The DID flag is set to 1 when information of the DID field of the MAC packet (FIG. 13) is valid and is set to 0 when it is invalid.

In bits 0 and 1, which are lower-order bits of the PFB information located in the MAC packet when data requested by an application is transmitted and received, 2-bit PNI (Packet Number Information) is located. PNI, whose initial value is set at 0, is incremented by 1 when succeeding MAC packets are transmitted.

That is, as illustrated in FIG. 13, in the NFC communication apparatus, an LLC packet is capsulized in an MAC packet, the MAC packet is capsulized in a physical layer packet, and the physical layer packet is transmitted.

In NFCIP-1, when an LLC packet is to be capsulized in an MAC packet, the whole LLC packet is capsulized in one MAC packet. As a result, one LLC packet is transmitted using one MAC packet. In addition, the LLC packet is divided into a plurality of pieces of data. Each of the plurality of pieces of data obtained by the division is capsulized in one MAC packet. As a result, one LLC packet can be transmitted using a plurality of MAC packets.

When one LLC packet is to be transmitted using one MAC packet, the PNI of the one MAC packet is set to 0. When one LLC packet is to be transmitted using a plurality of MAC packets, for example, four MAC packets, the PNI of the first MAC packet is set to 0, and the PNI of the second MAC packet is set to 1. Then, the PNI of the third MAC packet is set to 2 (10 in the case of a binary number), and the PNI of the third MAC packet is set to 3 (11 in the case of a binary number).

For example, when the initiator transmits one LLC packet by using four MAC packets in the manner described above, it is possible for the target to reconstruct the original one LLC packet (LLC packet that is capsulized over four MC packets) by referring to the PNI of the MAC packets from the initiator.

Since the PNI, as described above, is two bits long, the maximum number of MAC packets in which one LLC packet can be divided and located is 4 ($=2^2$).

At this point, in the MAC layer, each time one LLC packet from the LLC layer is processed, the MAC layer responds to the LLC layer in order to report the processing result (information on whether or not the LLC packet has been normally transmitted or received) to the (the LLC layer). Therefore, the maximum number of MAC packets that can be transmitted continuously from the MAC layer to the LLC layer without making a response is equal to the maximum number of MAC packets in which one LLC packet can be divided and located, and is 4 in the manner described above.

Therefore, the LLC packets that are passed to the MAC packets by the LLC layer need to be LLC packets that can be located (contained) in four MAC packets at most.

Next, FIG. 15 shows PFB information located in the PFB field of FIG. 13 when ACK/NACK is transmitted and received in data exchange during exchanging of the command DEP_REQ and the response DEP_RES.

The higher-order bits 7, 6, and 5 of the PFB information located in the MAC packet when ACK/NACK is transmitted and received are set to 0, 1, and 0, respectively. Furthermore, in the fourth bit from the highest order, that is, in bit 4, a 1-bit ACK/NACK flag indicating ACK/NACK is located.

At this point, the ACK/NACK flag indicates ACK when the value of the ACK/NACK flag is 1 and indicates NACK when the value of the ACK/NACK flag is 0.

In bits 3 and 2, which are the fifth and sixth bits from the highest order of the PFB information located in the MAC packet when ACK/NACK is transmitted and received, similarly to the case shown in FIG. 14, an NAD flag and a DID flag are located, respectively. Furthermore, in bits 0 and 1, which are the two lower-order bits of the PFB information, also, similarly to the case shown in FIG. 14, 2-bit PNI is located.

An MAC packet as ACK/NACK is transmitted so that, for example, when the initiator transmits an MAC packet in which certain data is located to the target, the target informs the initiator of the received state (received result) of the MAC packet from the initiator. For this reason, the PNI of the MAC packet as ACK/NACK is made to be the same value as that of the PNI of the MAC packet (MAC packet transmitted by the initiator) that intend to inform the initiator of the received state using ACK/NACK.

Figure 16:
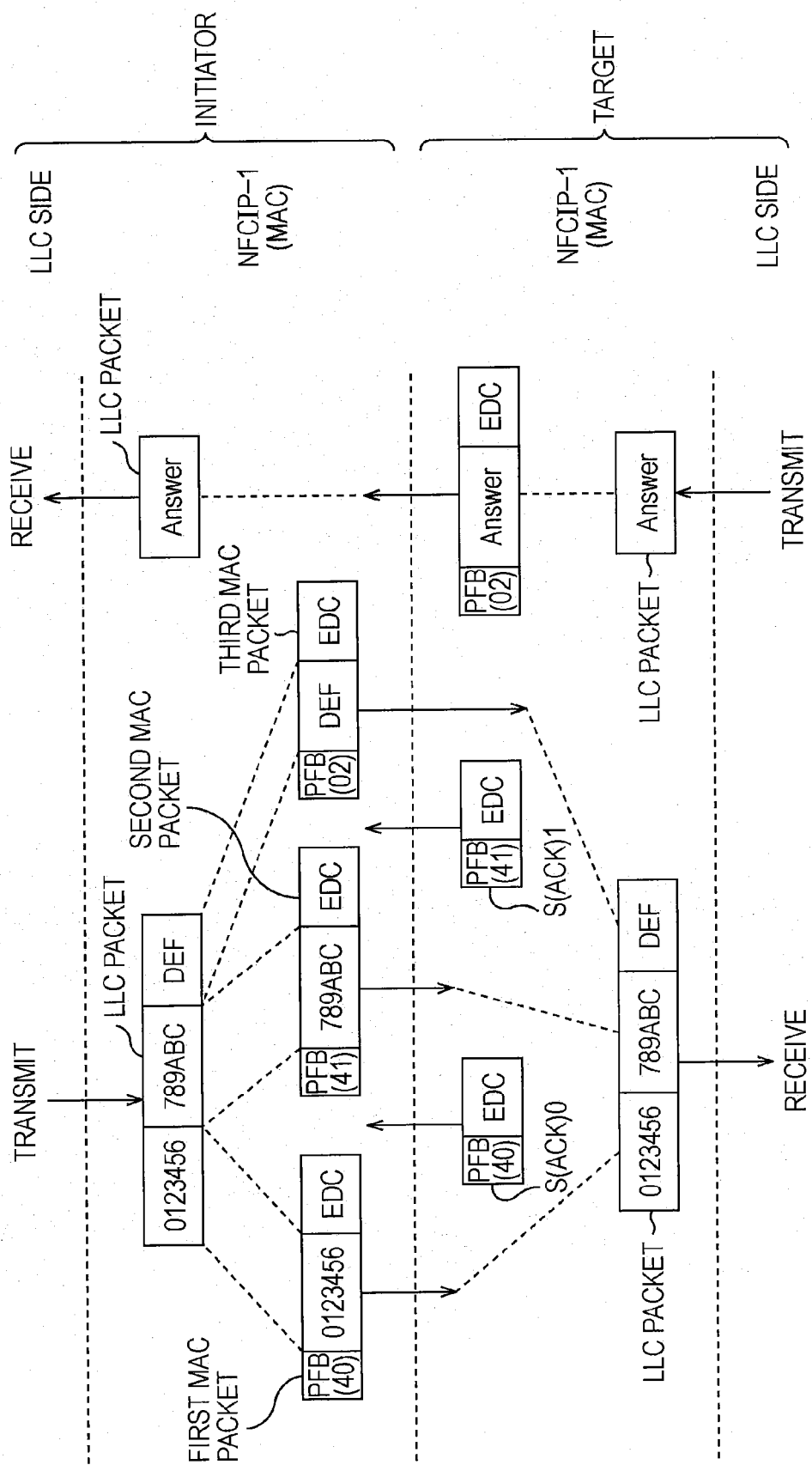
FIG. 16 is an illustration of processing of an MAC layer in an initiator and a target.

Next, a description will be given, with reference to FIG. 16, of processing of an MAC layer in the initiator and the target when the initiator divides one LLC packet into a plurality of pieces of data and transmits them to the target by using a plurality of MAC packets. In FIG. 16, EDC (Error Detection Code) indicates code for detecting an error.

In FIG. 16, the illustration of processing of a physical layer (processing of capsulizing an MAC packet in a physical layer packet) is omitted.

In FIG. 16, it is assumed that information on the NAD field and the DID field of the MAC packet (FIG. 13) is invalid. Therefore, both the fifth and sixth bits from the highest order of the PFB information located in the PFB field of the MAC packets, that is, bits 3 and 2, are assumed to be 0.

Furthermore, it is assumed in FIG. 16 that all the MAC packets transmitted from the initiator to the target are normally received. Therefore, the target is assumed to send back (transmit) an MAC packet as ACK in reply to all the MAC packets transmitted from the initiator.

In FIG. 16, in the initiator, one LLC packet is divided into three pieces of data and these are transmitted to the target by using three MAC packets.

That is, in the initiator, data "0123456789ABCDEF" as one LLC packet is supplied from the LLC layer to the MAC layer. In the MAC layer of the initiator, data "0123456789ABCDEF" as one LLC packet is divided into three pieces of data "0123456", "789ABC", and "DEF". These are capsulized in a first MAC packet, a second MAC packet, and a third MAC packet and are transmitted to the target.

At this point, all the first to third MAC packets are MAC packets for transmitting (receiving) data requested by the application. For this reason, all the bits 7, 6, and 5 of the PFB information located in the PFB field (FIG. 13) are set to 0, as described in FIG. 14.

For the first and second MAC packets, MAC packets (second and third MAC packets) succeeding them exist. Therefore, the MI flag of bit 4 of the PFB information is set at 1, as described in FIG. 14. On the other hand, for the third MAC packet, no succeeding MAC packets exist, and therefore, the MI flag is set at 0, as described in FIG. 14.

Furthermore, since the first MAC packet is a first MAC packet of the three first to third MAC packets, the PNI of bits 0 and 1 of the PFB information are set at 0, which is an initial value. Since the second MAC packet is a second MAC packet of the three first to third MAC packets, the PNI of the PFB information is 1 such that the PNI of the first MAC packet is incremented by 1. Since the third MAC packet is a third MAC packet of the three first to third MAC packets, the PNI of the PFB information is 2 such that the PNI of the second MAC packet is incremented by 1.

On the basis of the above, the PFB information of the first MAC packet is 10 as a hexadecimal number (00010000 as a binary number), and the PFB information of the second MAC packet is 11 as a hexadecimal number (00010001 as a binary number). The PFB information of the third MAC packet is 02 as a hexadecimal number (00000010 as a binary number).

On the other hand, the target receives the first MAC packet from the initiator and transmits an MAC packet S(ACK)$_0$ as ACK indicating that the first MAC packet has been normally received. Furthermore, the target receives the second MAC packet from the initiator and transmits an MAC packet S(ACK)$_1$ as ACK indicating that the second MAC packet has been normally received.

At this point, since the MAC packets S(ACK)$_0$ and S(ACK)$_1$ are MAC packets for transmitting (receiving) ACK/NACK, bits 7, 6, and 5 of the PFB information located in the PFB field (FIG. 13) are 0, 1, and 0, respectively, as described in FIG. 15.

Since no MAC packet to be transmitted following the MAC packet S(ACK)$_0$ exists and no MAC packet to be transmitted following the MAC packet S(ACK)$_1$ exists, the transmission of bit 4 of the PFB information of each of the MAC packets S(ACK)$_0$ and S(ACK)$_1$ is set at 0, as described in FIG. 14.

Furthermore, since the MAC packet S(ACK)$_0$ is ACK for the first MAC packet, the PNI of bits 0 and 1 of the PFB information of the MAC packet S(ACK)$_0$ is 0, which is the same value as the PNI of the first MAC packet. Since the MAC packet S(ACK)$_1$ is ACK for the second MAC packet, the PNI of the PFB information of the MAC packet S(ACK)$_1$ is 1, which is the same value as the PNI of the second MAC packet.

On the basis of the above, the PFB information of the MAC packet S(ACK)$_0$ is 40 as a hexadecimal number (01000000 as a binary number), and the PFB information of the MAC packet S(ACK)$_1$ is 41 as a hexadecimal number (01000001 as a binary number).

The MAC packets S(ACK)$_0$ and S(ACK)$_1$ transmitted by the target are received by the MAC layer of the initiator. As a result, the MAC layer of the initiator recognizes that the first and second MAC packets have been normally received by the MAC layer of the target.

Thereafter, the target receives the third MAC packet from the initiator. The MI flag of bit 4 of the PFB information of the third MAC packet, as described above, is 0. As a result, the target recognizes that no MAC packet that follows the third MAC packet exists, that is, recognizes that the third MAC packet is a final MAC packet. In this case, the target connects, in the MAC layer, the data "0123456" that has been capsulized in the first MAC packet, the data "789ABC" that has been capsulized in the second MAC packet, the data "DEF" that has been capsulized in the third MAC packet, the first, second, and third MAC packets being obtained thus far, in this order by referring to the PNI, reconstructs the data "0123456789ABCDEF" as the original LLC packet, and supplies it from the MAC layer to the LLC layer.

Thereafter, in the LLC layer of the target, an LLC packet Answer as a response to the data "0123456789ABCDEF" from the MAC layer is supplied to the MAC layer. In the MAC layer of the target, the LLC packet Answer is capsulized in the MAC packet and is transmitted to the initiator.

The MAC packet in which the LLC packet Answer is capsulized is a response from the LLC layer (or a higher-order layer) for the entire data "0123456789ABCDEF" as the LLC packet from the initiator, and is an MAC packet for transmitting (receiving) data requested by the application. Therefore, all the bits 7, 6, and 5 of the PFB information located in the PFB field (FIG. 13) are 0, as described in FIG. 14.

Furthermore, since an MAC packet to be transmitted following the MAC packet in which the LLC packet Answer is capsulized does not exist, the MI flag of bit 4 of the PFB information of the MAC packet is 0, as described in FIG. 14.

The PNI (FIG. 14) of the PFB information of the MAC packet in which the LLC packet Answer is capsulized is 2, which is the same as the PNI of the third MAC packet that is received just before from the initiator by the target.

On the basis of the above, the PFB information of the MAC packet in which the LLC packet Answer is capsulized is 02 as a hexadecimal number (00000010 as a binary number).

The MAC packet in which the LLC packet Answer is capsulized, the MAC packet being transmitted by the target, is received by the MAC layer of the initiator. As a result, the MAC layer of the initiator recognizes that the third MAC packet has been normally received in the MAC layer of the target. Furthermore, the initiator decapsulizes the MAC packet in the MAC layer and supplies the LLC packet Answer obtained thereby to the LLC layer. As a result, the LLC layer (or a higher-order layer) of the initiator recognizes that the data "0123456789ABCDEF" as the LLC packet has been normally received in the LLC layer of the target.

Next, the controller 21 of the NFC communication apparatus shown in FIG. 4 performs the above-described processing of the MAC layer and the physical layer of NFCIP-1, that is, for example, processing of capsulizing an LLC packet in an MAC packet, processing of capsulizing the MAC packet in a physical layer packet, and others. Also, in the processing of the LLC layer, the controller 21 of the NFC communication apparatus limits the maximum length of the LLC packet supplied to the MAC layer so as to be smaller than or equal to the length that is determined on the basis of the maximum length of the physical layer packet and the maximum number of MAC packets that can be transmitted continuously from the MAC layer to the LLC layer without making a response.

That is, since the PNI of the PFB information, which is used in the MAC layer of NFCIP-1, as described in FIGS. 13 to 15, is two bits long, the maximum number of MAC packets in which one LLC packet can be divided and located is 4 ($=2^2$). As described above, the maximum number of MAC packets that can be transmitted continuously from the MAC layer to the LLC layer without making a response is equal to the maximum number of MAC packets in which one LLC packet can be divided and located, and therefore, is likewise 4.

On the other hand, since the MAC packet is capsulized in the physical layer packet, as described above, the maximum length of the MAC packet is limited on the basis of the maximum length (of the transport data field (FIG. 13)) of the physical layer packet, and is 254 bytes as described above in this embodiment.

Furthermore, in this embodiment, as shown in FIG. 13, the 5 bytes of the MAC packet are used as a CMD0 field, a CMD1 field, a PFB field, a DID field, and an NAD field. Therefore, the maximum length of the data of the LLC layer, which can be capsulized in the MAC packet, is limited to 249 (=254−5) bytes.

As described in the foregoing, the maximum length of the data of the LLC layer, which can be capsulized in the MAC packet, is 249 bytes, and the maximum number of MAC packets that can be transmitted continuously from the MAC layer to the LLC layer without making a response in the MAC layer is 4. Therefore, in the MAC layer, if the size of one LLC packet supplied from the LLC layer exceeds 996 bytes (=249 bytes×4), it is difficult to process the LLC packet.

Accordingly, in the processing of the LLC layer, the controller 21 (FIG. 4) limits the maximum length of the LLC packets supplied to the MAC layer so as to be a length that is determined on the basis of the maximum length of the physical layer packet (in its turn, the maximum length of the data of the LLC layer, which can be capsulized in the MAC packet at the maximum length, which can be located in the transport data field (FIG. 13) of the physical layer packet) and the maximum number of MAC packets that can be transmitted continuously from the MAC layer to the LLC layer without making a response, that is, 996 bytes (=249 bytes×4) in this embodiment.

As a result, it is possible to use near field communication employing NFCIP-1 that defines the data link layer and the physical layer from various protocols of the network layer or higher-order layers of the OSI reference model (FIG. 12).

For example, in the Internet, TCP/IP (Transmission Control Protocol/Internet Protocol) is adopted. It is possible to use near field communication employing NFCIP-1 from the TCP/IP.

That is, in the TCP/IP, data of TCP is capsulized in an IP packet, and is transmitted and received. The transmission/reception of the IP packets can be performed by near field communication employing NFCIP-1.

Figure 17:
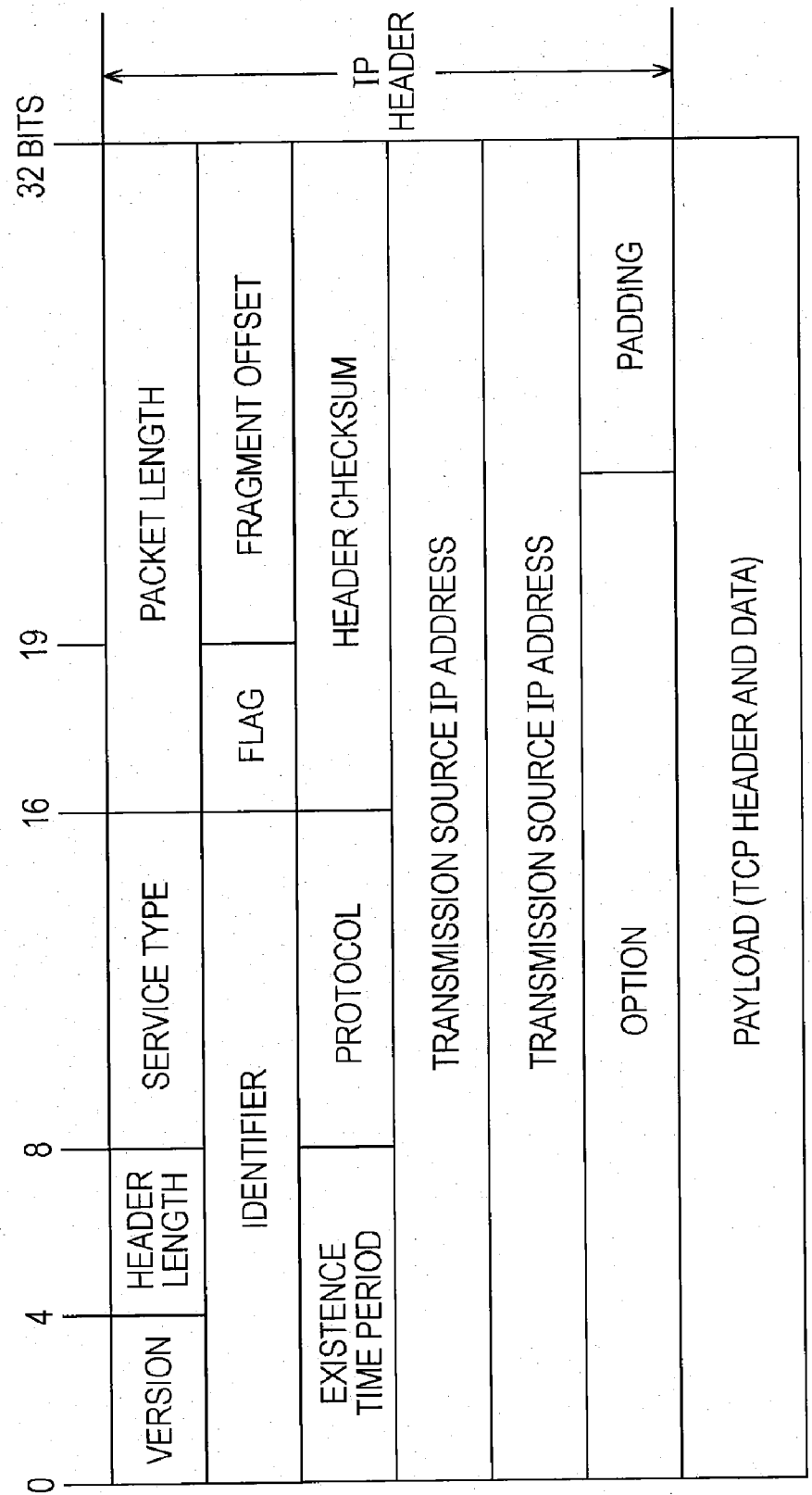
FIG. 17 shows the format of an IP packet.

FIG. 17 shows the format of an IP packet.

The IP packet is composed of an IP header field and a payload field.

Header information of IP is located in the IP header field of the IP packet.

The header information of IP contains a 4-bit version, a 4-bit header length, an 8-bit service type, a 16-bit packet length, a 16-bit identifier, a 3-bit flag, a 13-bit fragment offset, an 8-bit existence time period, an 8-bit protocol, a 16-bit header checksum, a 32-bit transmission source IP address, a 32-bit transmission destination IP address, a variable-length option, and necessary padding.

The version indicates the version of IP. The IP header field shown in FIG. 17 is that of Ipv4, and the structure of the IP header field of Ipv6, which has progressed at present from Ipv4, differs from the IP header field of Ipv4. For this reason, the version is used to identify the structure of the IP header field.

The header length indicates the size of the IP header field, and the service type indicates the quality of the service of the IP. In the service type, a priority, a low delay request, a high throughput request, a high reliability request, and the like can be specified.

The packet length indicates the size (the octet length) of an IP packet.

The identifier, the flag, and the fragment offset are used to fragment IP packets. That is, there are cases in which the maximum length (of the payload) of the packet of a layer lower than IP is smaller than the maximum length of an IP packet to be transmitted. In this case, it is necessary to divide an IP packet at a size at which it can be capsulized in the packets of a lower-order layer. The identifier, the flag, and the fragment offset are used to divide IP packets in such a manner as described above.

More specifically, the identifier is used to identify an IP packet before it is divided when one IP packet can be divided into a plurality of IP packets. The flag indicates whether or not an IP packet can be divided (permitted to be divided) or whether or not there are succeeding IP packets after being divided. The fragment offset indicates the sequence number indicating the sequential position of the IP packet among the plural divided packets.

The existence time period indicates a time period during which an IP packet can exist in a network. That is, a router in the network decreases the existence time period of the IP packet each time the IP packet is processed and discards it when the existence time period reaches 0.

The protocol indicates what the protocol of the higher-order transport layer of the IP (the protocol of the transport layer, which is capsulized in the IP packet) is and is, for example, TCP in TCP/IP.

The header checksum is code for detecting an error of the IP header information.

The transmission source IP address indicates the IP address of the transmission source of an IP packet, and the transmission destination IP address indicates the IP address of the transmission destination (target) of an IP packet.

The option is used during testing and debugging, and the padding is used to make the size of the header field so as to be an integral multiple of 32 bits.

Data of a higher-order layer of the IP is located in the payload field of the IP packet. For example, in TCP/IP, data (packets) of TCP is located in the payload field.

When the above-described transmission/reception of IP packets is to be performed by near field communication employing NFCIP-1, in the LLC layer, the controller 21 (FIG. 4) of the NFC communication apparatus capsulize IP packets in order to generate LLC packets and supplies them to the MAC layer.

FIG. 18 shows the format of an LLC packet generated by the controller 21 in the LLC layer.

The LLC packet is composed of an LLC header field and a payload field. When the controller 21 capsulizes an LLC packet of FIG. 18 in an MAC packet in the MAC layer, the LLC packet of FIG. 18 is located in the data fields (DB0, DB1, . . . , DBn fields) of the MAC packet shown in FIG. 13.

In the LLC header field, for example, the following are located: the size of the LLC packet, various kinds of 4-byte information indicating the type of data located (capsulized) in the payload field or the like, 10-byte NFCID (Source NFCID) of the NFC communication apparatus that is the transmission source of the LLC packet, 10-byte NFCID (Destination NFCID) of the NFC communication apparatus that is the transmission destination (target) of the LLC packet, an option of 0 or more bytes, and the like.

In the payload field, for example, IP packets, which are data of a layer higher than the data link layer (LLC layer), are located.

At this point, the controller 21 (FIG. 4) of the NFC communication apparatus limits the size of the LLC packet so as to be smaller than or equal to 996 bytes when the size of the data of a layer higher than the data link layer (LLC layer), that is, for example, the size of the LLC packet in which the IP packet is capsulized, exceeds 996 bytes. Therefore, the maximum length of the LLC packet is 996 bytes.

In the embodiment of FIG. 18, the size of the LLC header field is at least 24 (=4+10+10) bytes. Therefore, the payload field of the LLC packet is 972 (=996−24) bytes at most.

On the basis of the above, the maximum value of the size of the IP packet that can be capsulized in the LLC packet (payload field) is 972 bytes.

On the other hand, the maximum length of the IP packet is 2k bytes (65536 bytes).

Therefore, when the transmission/reception of the IP packets is to be performed by near field communication employing NFCIP-1, in the LLC layer, the controller 21 (FIG. 4) of the NFC communication apparatus capsulizes IP packets in LLC packets and supplies them to the MAC layer. When the size of the IP packet exceeds 972 bytes, the size of the LLC packet exceeds 996 bytes at which processing is possible in the MAC layer.

When the size of the LLC packet in which the IP packet is capsulized exceeds 996 bytes, the controller 21 (FIG. 4) of the NFC communication apparatus limits the size of the LLC packet so as to be smaller than or equal to 996 bytes in the manner described above. This limitation is performed by dividing, for example, the IP packet into a plurality of pieces of data. That is, in the LLC layer, the controller 21 divides one IP packet into a plurality of pieces of data and capsulizes each piece of data, thereby generates a plurality of LLC packets whose size is 996 or less bytes, and supplies them to the MAC layer.

For example, when the initiator divides one IP packet in the LLC layer in the manner described above, generates a plurality of LLC packets whose size is 996 or less bytes (capsulized in an MAC packet), and transmits them to the target, in the LLC layer, it is necessary for the target to reconstruct the plurality of LLC packets from the initiator into the original one IP packet.

Accordingly, it is possible for the target to contain, in the various kinds of information of the LLC header field of FIG. 18, information necessary for reconstructing the divided IP packets transmitted from the initiator over a plurality of LLC packets in the manner described above into one original IP packet (hereinafter referred to as "reconstruction information" as appropriate).

As the reconstruction information, for example, information similar to the MI flag and the PNI of the PFB information described in FIGS. 13 to 15, that is, information indicating whether or not there are succeeding LLC packets and information indicating the sequential position of the LLC packet, can be used.

As described in the foregoing, in (the controller 21 (FIG. 4) of) the initiator, an LLC packet is capsulized in an MAC packet, the MAC packet is capsulized in a physical layer packet, and the physical layer packet is transmitted in the active mode or in the passive mode. In that case, the maximum length of the LLC packet is limited so as to be smaller than or equal to a length that is determined on the basis of the maximum length of the physical layer packet and the maximum number of MAC packets that can be transmitted continuously from the MAC layer to the LLC layer without making a response. On the other hand, in (the controller 21 (FIG. 4) of) the target, a physical layer packet in which the LLC packet whose maximum length is limited in this manner is capsulized in the end is received.

Therefore, it is possible to use NFCIP-1 from various protocols of the network layer.

Information located in the LLC header field (FIG. 18) is not limited to the above-described information. That is, for example, when an IP packet is to be capsulized in the LLC packet, a 16-bit packet length (information of a size (16 bits) capable of indicating the maximum length of the IP packet) within the header information located in the IP header field of the IP packet, and other header information can be located in the LLC header field. Also, the size of the LLC header field is not limited to 24 bytes shown in FIG. 18. Furthermore, the structure of the LLC header field is also not limited to the structure shown in FIG. 18, and can be made to be, for example, a structure similar to the IP header field shown in FIG. 17.

Data to be capsulized in LLC packets is not limited to IP packets. That is, near field communication employing NFCIP-1 can be used from various protocols of other than the IP of the network layer.

In addition, the formats of the physical layer packet and the MAC packet are not limited to the above-described formats.

Processes described in this specification do not always need to be time-sequentially performed in the order written as a flowchart, but include processes executed in parallel or individually (for example, parallel processes or object-oriented processes).

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A communication apparatus for performing communication with another communication apparatus that is a communication party, the communication apparatus comprising: communication means for performing communication in one of: (a) an active mode, which is a communication mode in which each of a plurality of apparatuses for transmitting and receiving data outputs an electromagnetic wave, modulates the electromagnetic wave, and thereby transmits data; and (b) passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and control means for performing a control such that an LLC packet that is a packet of an LLC layer of a data link layer of an OST reference model is capsulized to form a MAC packet that is a packet of a MAC layer of the data link layer, the MAC packet is capsulized to form a physical layer packet that is a packet of a physical layer, and the physical layer packet is transmitted in the active mode or in the passive mode, wherein the control means limits the maximum length of the LLC packet so as to be smaller than or equal to a length that is determined on the basis of the maximum length of the physical layer packet and the maximum number of MAC packets that can be transmitted continuously from the MAC layer to the LLC layer without a response.

2. The apparatus according to claim 1, wherein the LLC packet is such that an IP packet is capsulized.

3. The communication apparatus according to claim 2, wherein the LLC packet is such that the IP packet, with at least a header being attached to the IP packet, is capsulized, and wherein the header of the LLC packet contains information on the size capable of indicating the maximum length of the packet.

4. A communication method for performing communication with another communication apparatus that is a communication party, the communication method comprising: performing communication in one of: (a) an active mode, which is a communication mode in which each of a plurality of apparatuses for transmitting and receiving data outputs an electromagnetic wave, modulates the electromagnetic wave, and thereby transmits data; and (b) a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and performing a control such that an LLC packet that is a packet of an LLC of a data link layer of an OSI reference model is capsulized to form a MAC packet that is a packet of a MAC layer of the data link layer, the MAC packet is capsulized to form a physical layer packet that is a packet of a physical layer, and the physical layer packet is transmitted in the active mode or in the passive mode, wherein, in the control step, the maximum length of the LLC packet is limited so as to be smaller than or equal to a length that is determined on the basis of the maximum length of the physical layer packet and the maximum number of MAC packets that can be transmitted continuously from the MAC layer to the LLC layer without response.

5. A computer readable medium storing that when executed by a processor, cause a communication apparatus for performing communication in one of; (a) an active mode, which is a communication mode in which each of a plurality of apparatuses for transmitting and receiving data outputs an electromagnetic wave, modulates the electromagnetic wave, and thereby transmits data; and (b) a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus, control such that an LLC packet that is a packet of an LLC of a data link layer of an OSI reference model is capsulized to form a MAC packet that is a packet of a MAC (Media Access Control) layer of the data link layer, the MAC packet is capsulized to form a physical layer packet that is a packet of a physical layer, and the physical layer packet is transmitted in the active mode or in the passive mode, wherein, maximum length of the LLC packet is limited so as to be smaller than or equal to a length that is determined on the basis of tile maximum length of the physical layer packet and the maximum number of MAC packets that can be transmitted continuously from the MAC layer to the LLC layer without a response.

6. A communication apparatus for performing communication with another communication apparatus that is a communication party, the communication apparatus comprising: communication means for performing communication in one of: (a) an active mode, which is a communication mode in which each of a plurality of apparatuses for transmitting and receiving data outputs an electromagnetic wave, modulates the electromagnetic wave, and thereby transmits detail and (b) a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and control means for performing control such that an LLC packet that is a packet of an LLC layer of a data link layer of an OSI reference model is capsulized to form a MAC packet that is a packet of a MAC layer of the data link layer, the MAC packet is capsulized to form a physical layer packet that is a packet of a physical layer, and the physical layer packet from an apparatus for transmitting the physical layer packet is received in the active mode or in the passive mode, wherein the maximum length of the LLC packet is limited so as to be smaller than or equal to a length that is determined on the basis of the maximum length of the physical layer packet and the maximum number of MAC packets that can be transmitted continuously from the MAC layer to the LLC layer without a response.

7. The communication apparatus according to claim 6, wherein the LLC packet is such that an packet is capsulized.

8. The communication apparatus according to claim 7, wherein the LLC packet is such that the IP packet, with at least a header being attached to the packet, is capsulized, and wherein the header of the LLC packet contains information on the size capable of indicating the maximum length of the IP packet.

9. A method for performing communication with another communication apparatus that is a communication party, the method comprising:
performing communication in one of (a) an active mode, which is a communication mode in which each of a plurality of apparatuses for transmitting and receiving data outputs an electromagnetic wave, modulates the electromagnetic wave, and thereby transmits data; and (b) passive mode, which is a communication mode in which one apparatus among a plurality of apparatuses outputs an electromagnetic wave, the electromagnetic wave, and thereby transmits data, and the other apparatuses among the plurality of apparatuses transmit data by load-modulating the electromagnetic wave output by the one apparatus; and performing control such that such that an LLC packet that is a packet of an LLC layer of a data link layer of an OS reference model is capsulized to form a MAC packet that is a packet of a MAC layer of the data link layer, the MAC packet is capsulized to form a physical layer packet that is a packet of a physical layer, and the physical layer packet from an apparatus for transmitting the physical layer is received in file active mode or in the passive mode, wherein the maxim urn length of the LLC packet is limited so as to be smaller than or equal to a length that is determined on the basis of the maximum length of the physical layer packet the maximum number of MAC packets can be transmitted continuously from the MAC layer to the LLC layer without a response.

10. A computer-readable medium including executable instructions that when executed by a processor performs steps for controlling a communication apparatus for performing communication in one of communication modes of an active mode, which is a communication mode in which each of a plurality of apparatuses for transmitting and receiving data outputs an electromagnetic wave, modulates the electromagnetic wave, and thereby transmits data; and a passive mode, which is a communication mode in which one apparatus among a plurality of apparatuses outputs an electromagnetic wave, modulates the electromagnetic wave, and thereby transmits data, and other apparatuses among the plurality of apparatuses transmit data by load-modulating the electromagnetic wave output by the one apparatus, the steps comprising: a control step of performing control such that an LLC packet that is a packet of an LLC layer of a data link layer of an OSI reference model is capsulized to form a MAC packet that is a packet of a MAC layer of the data link layer, the MAC packets is capsulized to form a physical layer packet that is a packet of a physical layer, and the physical layer packet from an apparatus for transmitting the physical layer packet is received in the active mode or in the passive mode, wherein the maximum length of the LLC packet is limited so as to be smaller than or equal to a length that is determined on the basis of the maximum length of the physical layer packet and the maximum number of MAC packets that can be transmitted continuously from the MAC layer to the LLC layer without a response.

* * * * *